US009806977B2

(12) United States Patent
Waheed et al.

(10) Patent No.: US 9,806,977 B2
(45) Date of Patent: Oct. 31, 2017

(54) MULTI-RATE OVERLAY MODE IN WIRELESS COMMUNICATION SYSTEMS

(71) Applicant: FREESCALE SEMICONDUCTOR, INC., Austin, TX (US)

(72) Inventors: Khurram Waheed, Austin, TX (US); Mihai-Ionut Stanciu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 79 days.

(21) Appl. No.: 15/042,948

(22) Filed: Feb. 12, 2016

(65) Prior Publication Data

US 2017/0126533 A1    May 4, 2017

(30) Foreign Application Priority Data

Nov. 4, 2015  (RO) .............................. A201500791

(51) Int. Cl.
    *H04L 27/00*   (2006.01)
    *H04L 12/26*   (2006.01)
    *H04W 24/08*   (2009.01)

(52) U.S. Cl.
    CPC ...... *H04L 43/0894* (2013.01); *H04L 27/0008* (2013.01); *H04W 24/08* (2013.01)

(58) Field of Classification Search
    None
    See application file for complete search history.

(56) References Cited

U.S. PATENT DOCUMENTS 6,640,325 B1 * 10/2003 Fischer ................. H04L 1/0061
                                                    709/232
6,907,044 B1 *  6/2005 Yonge, III ............ H04W 74/02
                                                    370/445

(Continued)

FOREIGN PATENT DOCUMENTS

| CN | 101849387 A  | 9/2010 |
| EP | 2206292 A1   | 7/2010 |
| WO | 2009061559 A1| 5/2009 |

OTHER PUBLICATIONS

IEEE Standard for Local and metropolitan area networks—Part 15.4, Sep. 5, 2011, 314 pages.

(Continued)

*Primary Examiner* — Alex Skripnikov

(57) ABSTRACT

A method is provided, which includes identifying a data transfer rate associated with a wireless communication device. The data transfer rate is identified from a group including a legacy data transfer rate and a plurality of non-legacy data transfer rates. In response to identification of a selected non-legacy data transfer rate, a selected non-legacy modulation scheme is identified, which is associated with the selected non-legacy data transfer rate. Modulation of a data payload is performed according to the selected non-legacy modulation scheme. A non-legacy header structure is formed that includes a non-legacy start-of-frame delimiter (SFD) and an identifier of the selected non-legacy modulation scheme. Modulation of the non-legacy header structure is performed according to the legacy modulation scheme. The modulated non-legacy header structure and the modulated data payload are assembled into a non-legacy frame having a structure that is different from a legacy frame structure specified by the legacy protocol.

20 Claims, 10 Drawing Sheets

(56) References Cited

U.S. PATENT DOCUMENTS

| | | | |
|---|---|---|---|
| 7,693,191 B2* | 4/2010 | Gorday | H04B 1/707 370/320 |
| 7,983,235 B2 | 7/2011 | Powell et al. | |
| 7,990,937 B2 | 8/2011 | Chang et al. | |
| 8,433,020 B2 | 4/2013 | Buchwald et al. | |
| 8,606,986 B2 | 12/2013 | Whitby-Strevens et al. | |
| 8,743,862 B2 | 6/2014 | Powell et al. | |
| 2004/0047296 A1* | 3/2004 | Tzannes | H04L 1/0028 370/252 |
| 2006/0285604 A1* | 12/2006 | Walton | H04L 1/0002 375/267 |
| 2007/0291913 A1* | 12/2007 | Trainin | H04L 12/66 379/93.08 |
| 2009/0116462 A1 | 5/2009 | Powell et al. | |
| 2009/0116472 A1 | 5/2009 | Chang et al. | |
| 2011/0096685 A1* | 4/2011 | Lee | H04L 27/0012 370/252 |
| 2011/0261801 A1 | 10/2011 | Powell et al. | |
| 2015/0063191 A1* | 3/2015 | Merlin | H04L 47/12 370/312 |
| 2015/0286605 A1* | 10/2015 | Waters | G06F 13/4221 710/105 |
| 2016/0006842 A1* | 1/2016 | Tahir | H04L 69/03 370/470 |
| 2017/0099681 A1* | 4/2017 | Morioka | H04W 74/0816 |

OTHER PUBLICATIONS

Radiopulse Inc., MG2400-F48 Datasheet, Ver. 2.0, Jul. 20, 2007, 119 pages.

* cited by examiner

MULTI-RATE OVERLAY MODE IN WIRELESS COMMUNICATION SYSTEMS

BACKGROUND

Field

This disclosure relates generally to wireless communication systems, and more specifically, to transferring data utilizing a wireless communication protocol.

Related Art

Wireless communication devices that are used to form a wireless personal area network (WPAN) often have limited power sources and signaling infrastructure. These design limitations present significant challenges in terms of data transfer capabilities and power consumption during operation for extended periods of time. Consequently, various protocols have been developed to implement WPANs using small, power-efficient, inexpensive communication devices. For example, IEEE Standard 802.15.4 protocol is a communication protocol that specifies the physical layer and media access control for low-data-rate, low-power wireless personal area networks in which very low cost wireless communications to nearby devices are provided with little to no underlying infrastructure and limited power consumption. While IEEE Standard 802.15.4 protocol has provided a legacy data rate successfully utilized by many applications implemented in WPAN nodes, IEEE Standard 802.15.4 protocol cannot provide higher speed data rates that advanced applications require (e.g., audio application, file download application, firmware upgrade application).

BRIEF DESCRIPTION OF THE DRAWINGS

The present invention may be better understood, and its numerous objects, features, and advantages made apparent to those skilled in the art by referencing the accompanying drawings.

The present invention is illustrated by way of example and is not limited by the accompanying figures, in which like references indicate similar elements, unless otherwise noted. Elements in the figures are illustrated for simplicity and clarity and have not necessarily been drawn to scale.

DETAILED DESCRIPTION

Figure 1:
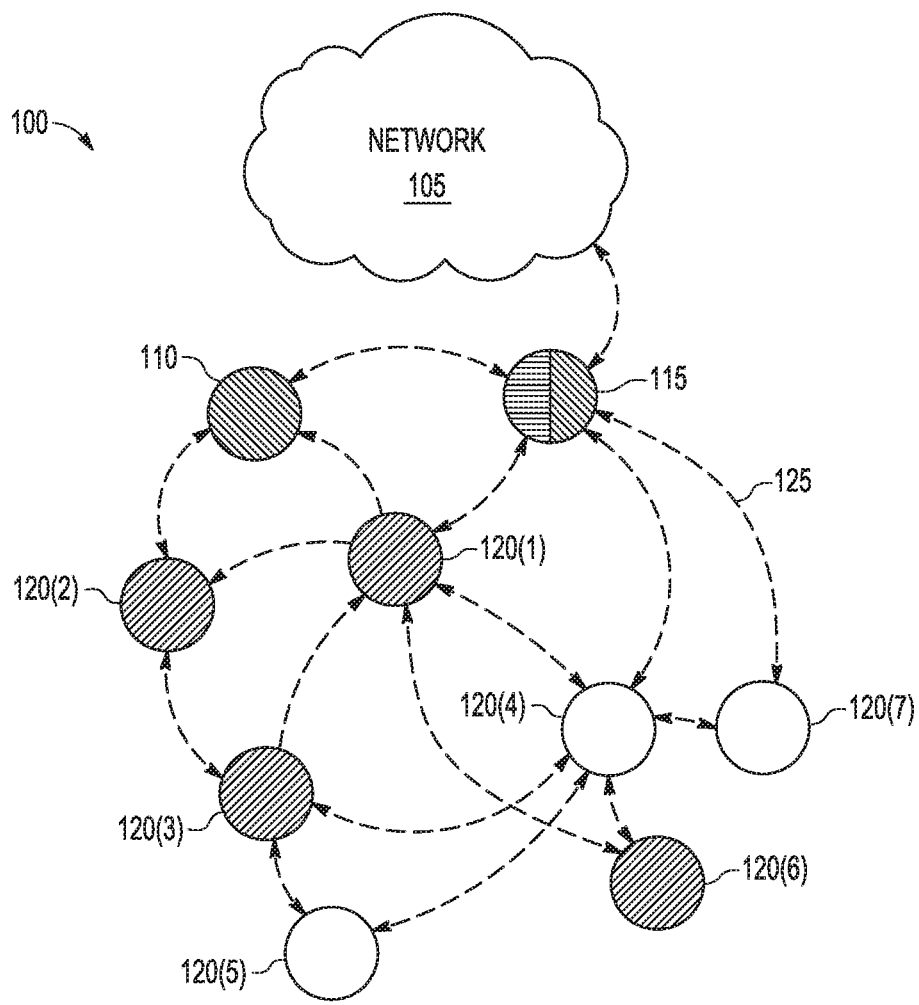
FIG. 1 illustrates a block diagram depicting an example wireless communication system in which the disclosure is implemented, according to some embodiments.

The following sets forth a detailed description of various embodiments intended to be illustrative of the invention and should not be taken to be limiting.

Overview

From a network perspective, there are two limitations of legacy IEEE Standard 802.15.4 protocol. One limitation includes low throughput at the physical (PHY) layer of the communication stack due to the slow data rate (or legacy data rate) of the legacy protocol, which translates into low throughput at the network layer. Another limitation includes small PHY protocol data unit (PPDU) size (e.g., 127 bytes), which requires fragmentation of packets at upper layers of the communication stack. For example, packet data is fragmented to fit into multiple PPDUs, which increases overhead due to relaying and retransmitting the multiple PPDUs. However, making the PPDU excessively large is also undesirable since it increases the probability for transmission error.

In order to improve the longevity of legacy IEEE Standard 802.15.4 protocol (also referred to herein as the legacy protocol), different speed data rates need to be implemented for data transfer. The present disclosure provides a multiple data rate (or multi-rate) overlay extension mode (or extension mechanism) to the legacy protocol that provides for extending the data rate during data transfer, and is accordingly compatible with the legacy protocol. The present disclosure provides that a node that is multi-rate (or non-legacy) capable may select the legacy data rate or one of a number of different data rates (also referred to as non-legacy data rates) for communication with a neighboring node, depending on whether the neighboring node is also multi-rate capable and whether the communication link between the pair of nodes supports one or more data rates. Example non-legacy data rates provided herein are faster than the legacy data rate, while one or more other example non-legacy data rates are slower than the legacy data rate in other embodiments. Each pair of nodes in the WPAN uses the selected data rate for communication between the pair of nodes.

A non-legacy frame structure is also provided herein, which is utilized for non-legacy data rate communication. A legacy frame structure is still utilized for legacy data rate communication. The non-legacy frame structure includes a non-legacy synchronization header (SHR), which in turn includes a non-legacy start-of-frame delimiter (SFD). The non-legacy SFD is different from the default SFD used in a legacy frame, and thus differentiates non-legacy frames from legacy frames. By using the existing legacy IEEE Standard 802.15.4 protocol platform for synchronization and SFD detection, the present disclosure provides a robust detection scheme for legacy frames and non-legacy frames, with minimal complexity added to SFD detection.

The non-legacy frame structure also includes a non-legacy PHY or protocol header (PHR), which includes an identifier of a modulation configuration that implements the selected non-legacy data rate used for communication. A modulation configuration specifies a modulation scheme, such as spread modulation using a non-legacy chip mapping or an encoding scheme, which is used to modulate a data payload of the non-legacy frame, while the SHR and PHR of the non-legacy frame are spread modulated using a chip mapping defined by the legacy protocol. In some embodiments, the data payload modulation scheme effectively shortens the duration of the payload of the non-legacy frame, which improves throughput of the transmitted non-legacy frame and achieves a faster data rate than the legacy data rate. In other embodiments, the data payload modulation scheme effectively lengthens the duration of the payload of the non-legacy frame, which reduces throughput of the transmitted non-legacy frame and achieves a slower data rate than the legacy data rate. Accordingly, each non-legacy modulation configuration achieves a data rate that is different than the legacy data rate. Data rates are also referred to as data transfer rates herein.

EXAMPLE EMBODIMENTS

FIG. 1 illustrates a block diagram depicting an example wireless communication system 100 in which selected embodiments of the present invention may be implemented. As illustrated, the wireless communication system 100 includes a plurality of transmitting/receiving nodes, such as nodes 110, 115, and 120(1)-(N) in the form of stationary or mobile devices that wirelessly exchange information by means of radio signals. Each node includes an antenna and circuitry for transmitting and receiving data. In some embodiments, a node may also include a processor. Components of an example node are further discussed below in connection with FIG. 2. Examples of nodes in system 100 include, but are not limited to, portable or cellular phones or handsets, wireless headsets, wireless physiological sensors, wireless computer peripherals, wireless home automation, and the like.

Bi-directional communication links 125 between the nodes of system 100, such as between nodes 110, 115, and 120(1)-(N), are illustrated by bi-directional arrows having broken lines. The nodes may communicate with one another via communication links 125 by utilizing a predetermined wireless communication protocol, such as the legacy IEEE Standard 802.15.4 protocol (also referred to herein as the legacy protocol), which configures wireless communication system 100 as a wireless personal area network (WPAN). In some embodiments, the nodes in the WPAN may be characterized as having short range communication links with one another. The WPAN may be configured as a star network, a peer-to-peer network that may be formed from any arbitrary pattern of connections (which may include multi-hop connections), such as a mesh network or a cluster tree network, and the like. The legacy protocol defines two types of nodes: a node having minimal communication functionality, which may be used to implement an end device node having modest resources, and a node having extensive communication functionality, which may be used to implement a coordinator or a routing node (e.g., a relay node) for relaying messages through the WPAN. Routing nodes may communicate with one another and with end device nodes, while end device nodes may also communicate with other neighboring end nodes as well as routing nodes. In the embodiment shown, nodes 110, 115, and 120(1)-(4) are routing nodes, while nodes 120(5)-(7) are end device nodes.

Node 110 is a routing node that also provides functionality of a global coordinator, which is responsible for network configuration, network management, and message routing of the WPAN. Optionally, node 115 is another routing node that provides functionality of both a local coordinator (e.g., for a cluster of relay nodes in the WPAN configured as a cluster tree) and a gateway node, which is responsible for communication between the WPAN and an external network 105, such as a local area network (LAN), a wide area network (WAN), or other network infrastructure, such as infrastructure providing internet connectivity.

Messages are relayed from end device to end device via routing nodes in the WPAN. Depending on communication link metrics of the WPAN obtained by global coordinator node 110, different routes may be selected through the WPAN to transfer messages to end device nodes. For example, node 120(5) may receive a message via node 120(3) or 120(4).

Some of the nodes, up to and including all nodes in the WPAN, implement the present disclosure, which is a multiple data rate (or multi-rate) overlay mode that is compatible with the legacy protocol. In the example WPAN illustrated in FIG. 1, routing nodes 110, 115, and 120(1)-(3) and end device node 120(6) implement both the legacy protocol and the multi-rate overlay mode of the present disclosure (as illustrated by circles having diagonal hashing), while routing node 120(4) and end device nodes 120(5) and 120(7) implement the legacy protocol and do not implement the multi-rate overlay mode (as illustrated by empty circles). While a particular embodiment of the WPAN is illustrated in FIG. 1, other embodiments of the WPAN include a varying number of nodes that implement both the legacy protocol and the multi-rate overlay mode (e.g., up to and including all nodes in the WPAN), a varying number of nodes that implement the legacy protocol, and a varying number of nodes that implement a coordinator node (e.g., multiple local coordinator nodes or zero local coordinator nodes).

The present disclosure provides that a node that is multi-rate (or non-legacy) capable may select one of a number of data rates for communication with a neighboring node, depending on whether the neighboring node is also multi-rate capable and whether the communication link between the pair of nodes supports one or more data rates. Each pair of nodes in the WPAN uses either the legacy data rate or one of a number of different data rates (also referred to as non-legacy data rates) for communication between the pair of nodes. A legacy frame structure is utilized for legacy data rate communication, while a non-legacy frame structure is utilized for non-legacy data rate communication. A non-legacy (or multi-rate) frame structure is further described below in connection with FIG. 5.

Figure 5:
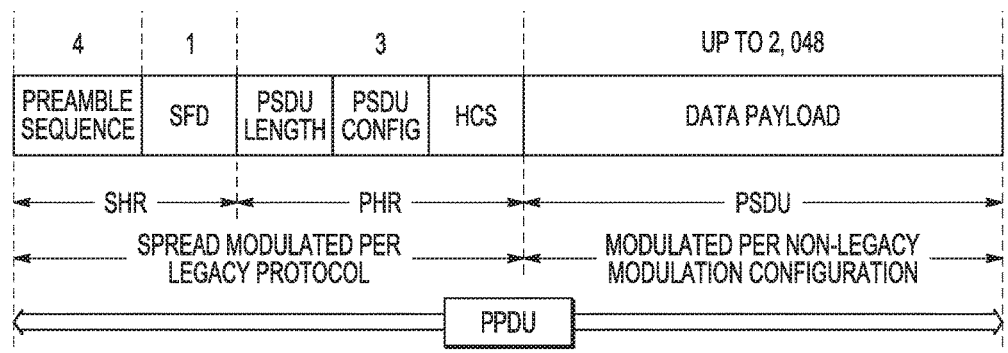
FIG. 5 illustrates a block diagram depicting selected components of an example frame structure utilized by multi-rate overlay mode functionality, according to some embodiments.

FIG. 5 illustrates a block diagram depicting selected components of an example non-legacy (or multi-rate) frame structure utilized for non-legacy data rate communication between a pair of nodes. The non-legacy frame structure may also be referred to herein as a non-legacy frame, a non-legacy PHY frame, or a non-legacy PHY protocol data unit (PPDU). The non-legacy frame structure includes a header structure that in turn includes a synchronization header (SHR) and a PHY or protocol header (PHR). The non-legacy frame structure also includes a data payload, referred to as a PHY or protocol service data unit (PSDU). These components are further discussed below.

The non-legacy frame is utilized when a non-legacy data rate (e.g., a data rate that is faster than the legacy data rate) is selected for communication between a pair of multi-rate capable nodes. Selection of the data rate is further discussed below in connection with FIG. 8. It is noted that once a transmitting node and a receiving node select a non-legacy data rate, the transmitting node processes a non-legacy frame differently than it would for a legacy frame. A transmitting node performs spread modulation of a legacy frame per the legacy protocol, where every four bits of a legacy frame are grouped into a symbol, and every 4-bit symbol is mapped into a 32-chip PN (pseudo-noise) sequence. The 4-bit symbol to 32-chip mapping is referred to herein as the legacy chip mapping, and is also utilized in the spread demodulation of the legacy frame by the receiving node. The spread modulated legacy frame (or chip-level data sequence) is then modulated before transmission using O-QPSK (offset quadrature phase shift keying) modulation, where O-QPSK demodulation is utilized by a receiving node. These operations provide a direct sequence spread spectrum (DSSS) system with a spreading factor of 8, which provides a processing gain of 9 dB (10×log 10(8)). This 1 to 8 spreading provides increased receiver sensitivity of the receiving node and increased transmission range.

The legacy data rate is about 250 kbps. In order to achieve a faster data rate, the present disclosure provides that multi-rate capable nodes may use other spreading factors for spread modulation. However, in order to maintain a robust frame detection platform for the nodes that also implement the legacy protocol, the present disclosure provides that the spreading factor is only changed for the PSDU of a non-legacy frame, while the spreading factor is not changed for the SHR and PHR of a non-legacy frame. In other words, the legacy chip mapping that implements a spreading factor of 8 is utilized for spread modulation of the SHR and PHR of a non-legacy frame, while a non-legacy modulation configuration that implements another spreading factor is utilized for the PSDU of a non-legacy frame. Several modulation configurations may be defined to achieve different non-legacy data rates, depending on the needs of the multi-rate capable nodes. Each non-legacy modulation configuration is associated with a unique identifier, PSDU Config. Each non-legacy modulation configuration is also associated with a PSDU modulation scheme for achieving the associated non-legacy data rate by providing a spreading factor smaller than 8. The PSDU modulation scheme may include a non-legacy chip mapping, which is utilized in both spread modulation and spread demodulation of the PSDU, or may instead include an encoding scheme, which is utilized in both encoding and decoding of the PSDU. While receiver sensitivity and transmission range of the receiving node is decreased when a smaller spreading factor is implemented, the example non-legacy modulation configurations provided each achieve a data rate faster than the legacy data rate (e.g., 3 dB performance degradation when doubling the data rate to 500 kbps). Transmission range is further discussed below in connection with FIG. 3.

Example non-legacy modulation configurations are provided in Table 1 below, each of which includes an associated modulation configuration identifier (PSDU Config), non-legacy data rate, and modulation scheme (either an encoding scheme or a chip mapping for spread modulation). For comparison, Table 1 also includes the legacy modulation configuration using the legacy chip mapping for a legacy frame. An associated PSDU spreading factor is also shown for each modulation configuration. Other embodiments may provide different modulation schemes (e.g., different encoding schemes or chip mappings or both) and different data rates achieved by such modulation schemes.

TABLE 1

Non-Legacy Modulation Configurations

| PSDU Config | Example Data Rate | Example Chip Mapping | PSDU Spreading |
|---|---|---|---|
| 0 | 2 Mbps, differentially coded | No spread modulation | 1x (diff) |
| 1 | 2 Mbps, pilots in PSDU | No spread modulation | 1x |
| 2 | 1 Mbps | 2-bit symbol to 4-chip | 2x |
| 3 | 500 kbps | 4-bit symbol to 16-chip | 4x |
| N/A (legacy frame) | 250 kbps | 4-bit symbol to 32-chip | 8x |

It is noted that the data rates listed in Table 1 may result in lower effective data rates for point-to-point communication, due to the effects of overhead present in the communication process, such as transmission of data frame overhead and signaling overhead resulting from other aspects of the communication process, such as transmitting and receiving acknowledgement (ACK) frames. For example, the legacy data rate of 250 kbps may achieve up to 100 kbps for point-to-point communication, while the non-legacy data rate of 2 Mbps may achieve up to 800 kbps for point-to-point communication.

Some example sequences that can be used for the 2-bit symbol to 4-chip mapping are provided below in Table 2. Each set of sequences includes two pairs of orthogonal sequences. A suitable combination provides statistical parity between "0" and "1" (e.g., the same number of "0"s and "1"s), such as two sequences including three "0"s and one "1" (such as 0001 and 0010) and another two sequences with one "0" and three "1"s (such as 1011 and 0111). The six example 2-bit symbol to 4-chip mapping sequences take advantage of the property that if two sequences (a,b) are orthogonal, then the sequences (a, NOT (b)) are also orthogonal.

TABLE 2

Example 2-bit symbol to 4-chip mapping sequences

| 1 | 2 | 3 | 4 | 5 | 6 |
|---|---|---|---|---|---|
| 0001 | 1110 | 1110 | 0001 | 0001 | 1110 |
| 0010 | 0010 | 1101 | 1101 | 1101 | 0010 |
| 1011 | 0100 | 0100 | 0100 | 1011 | 1011 |
| 0111 | 0111 | 1000 | 0111 | 1000 | 1000 |

The modulation configuration identified by PSDU Config of 0 indicates that the PSDU is not spread modulated, but instead is differentially encoded. In some embodiments, differentially encoding the PSDU includes taking a difference between every two bits (e.g., bit [i] and bit [i+1]) of the PSDU and encoding the difference. In other embodiments, differentially coding the PSDU includes fixing a first symbol of the PSDU, then taking the difference between each bit and the first symbol of the PSDU and encoding the difference. In some embodiments, differential encoding of the PSDU may be non-coherent.

The modulation configuration identified by PSDU Config of 1 indicates that the PSDU is not spread modulated, but instead is encoded using pilots inserted in the PSDU in a known pattern. The pilots add overhead and complexity to decoding the PSDU, but it compensates for synchronization impairments on a receiving node and improves reception quality.

Returning to FIG. 5, the non-legacy frame starts with an SHR that includes a preamble sequence that is used to synchronize a sending node and a receiving node, in order to prepare the receiving node for the incoming frame. In some embodiments, the SHR includes a preamble sequence of four octets, or eight symbols. In such embodiments, the preamble sequence is four octets long regardless of which non-legacy data rate is selected. In other embodiments, the length of the preamble sequence is based on the non-legacy data rate, or non-legacy modulation configuration, selected for communication. In such embodiments, the preamble sequence length decreases as the data rate increases. For example, the preamble length may be shortened to six symbols for a moderate non-legacy data rate (e.g., non-legacy data rate of up to 500 kbps), while the preamble length may be shortened to three symbols for a maximum non-legacy data rate (e.g., non-legacy data rate of up to 2 Mbps). Shortened preamble length is further discussed below in connection with FIG. 9.

The SHR also includes a non-legacy start-of-frame delimiter (SFD) that is different from the default legacy SFD used in the legacy protocol. The non-legacy SFD is one octet long and has a low cross-correlation with the legacy SFD in order for a receiving node to distinguish a non-legacy frame from a legacy frame. For example, the non-legacy SFD is selected to have a large Hamming distance from the default legacy SFD (e.g., legacy SFD of 0×A7, non-legacy SFD of 0×C5). It is preferred to use only two distinguishing SFDs in order to maintain reliable detection of legacy and non-legacy frame (e.g., prevent false frame detection/synchronization errors), as well as maintain simplicity of the synchronization process.

In some embodiments, the PHR of the non-legacy frame is three octets long. The PHR includes a variable PSDU length that reflects the amount of data being transmitted in the PSDU, or the payload of the non-legacy frame. In some embodiments, the PSDU length includes 13 bits, some of which may be reserved. In the embodiment shown, the PSDU length includes 11 bits with 2 reserved bits, providing a maximum PSDU length of up to 2048 bytes or octets. In some embodiments, the PSDU length field may also use additional bits to encode the PSDU length, resulting in support of longer PSDU lengths (e.g., using 13 bits provides a maximum PSDU length of up to 8192 bytes or octets). The SHR and PHR are spread modulated per legacy protocol, which includes spread modulation using a 4-bit symbol to 32-chip mapping and O-QPSK modulation.

The PHR also includes a PSDU Config identifier that is a unique identifier of the non-legacy modulation configuration that implements the non-legacy data rate selected for communication between the sending and receiving nodes. Since the non-legacy modulation configuration is associated with a particular PSDU modulation scheme that implements the non-legacy data rate selected for communication, the PSDU Config also uniquely identifies the associated modulation scheme for the PSDU, which may include a non-legacy chip mapping for spread modulation of the PSDU or an encoding scheme, as described above in connection with Table 1. The non-legacy modulation configurations and PSDU Config identifiers may be stored locally on multi-capable nodes, such as in a table in memory. In some embodiments, the PSDU Config field includes 3 bits, some of which may be reserved. In the embodiment shown, the PSDU Config field includes 2 bits to identify 4 non-legacy modulation configurations, although other embodiments may use 3 bits to identify up to 8 non-legacy modulation configurations.

In some embodiments, the PHR also includes a header check sequence (HCS) to protect the PHR contents. The HCS is an error-detecting code, such as a cyclic redundancy check (CRC) calculation performed on the PHR fields, including PSDU length and PSDU Config. The HCS allows for a receiving device to verify that the received PHR is reliable. In some embodiments, the HCS includes 8 bits, some of which may be reserved. In other embodiments, the PHR does not include the HCS, and instead is only two octets long.

The non-legacy frame also includes a PSDU, or data payload of the non-legacy frame. The PSDU has a variable length, as indicated by the PSDU length in the PHR. The maximum length of the non-legacy PSDU (e.g., 2 kb) is longer than the maximum length of the legacy data payload (e.g., 127 bytes), which reduces the amount of fragmentation needed when breaking up large packets to be included in the non-legacy PSDU (as compared with the large amount of fragmentation needed when using the small legacy frame data payload). For example, a packet that is 1280 bytes (e.g., a 6LoWPAN (Internet Protocol v6 over Low power WPAN) IP fragment) can be included as one fragment in a non-legacy frame (which can carry up to 2048 bytes) that can be communicated over-the-air in 5.1 milliseconds using a non-legacy data rate of 2 Mpbs. By contrast, the same packet would be included in 13 fragments using legacy frames (which can carry 127 bytes), each of which takes 4.1 ms at the legacy data rate, resulting in over 53 ms of over-the-air time. Further, reducing over-the-air activity of a node by using fewer fragments also extends the battery lifetime of the node. It is noted that the PSDU data payload is not made excessively long, which would require a longer over-the-air transmission time, ultimately outstripping the benefit of extending the battery lifetime of the node with fewer fragments. Also, as the length of the data payload increases, the chance for transmission error also increases, especially when using a low data transfer rate. This in turn would increase the probability of over-the-air transmission time due to the retransmissions required to error-free transmit such a long data payload.

The PSDU is modulated according to the modulation configuration identified by the PSDU Config identifier. For example, the PSDU may be spread modulated according to the non-legacy chip mapping of the modulation configuration, or may be encoded according to the encoding scheme of the modulation configuration. In the embodiment shown, the PSDU of a non-legacy frame may be spread modulated using either a 4-bit symbol to 16-chip mapping or a 2-bit symbol to 4-chip mapping, or may not be spread modulated at all and instead is encoded either differentially or by using pilots. Utilization of the non-legacy frame during communication between two multi-capable nodes is further discussed below in connection with FIG. 2.

Figure 2:
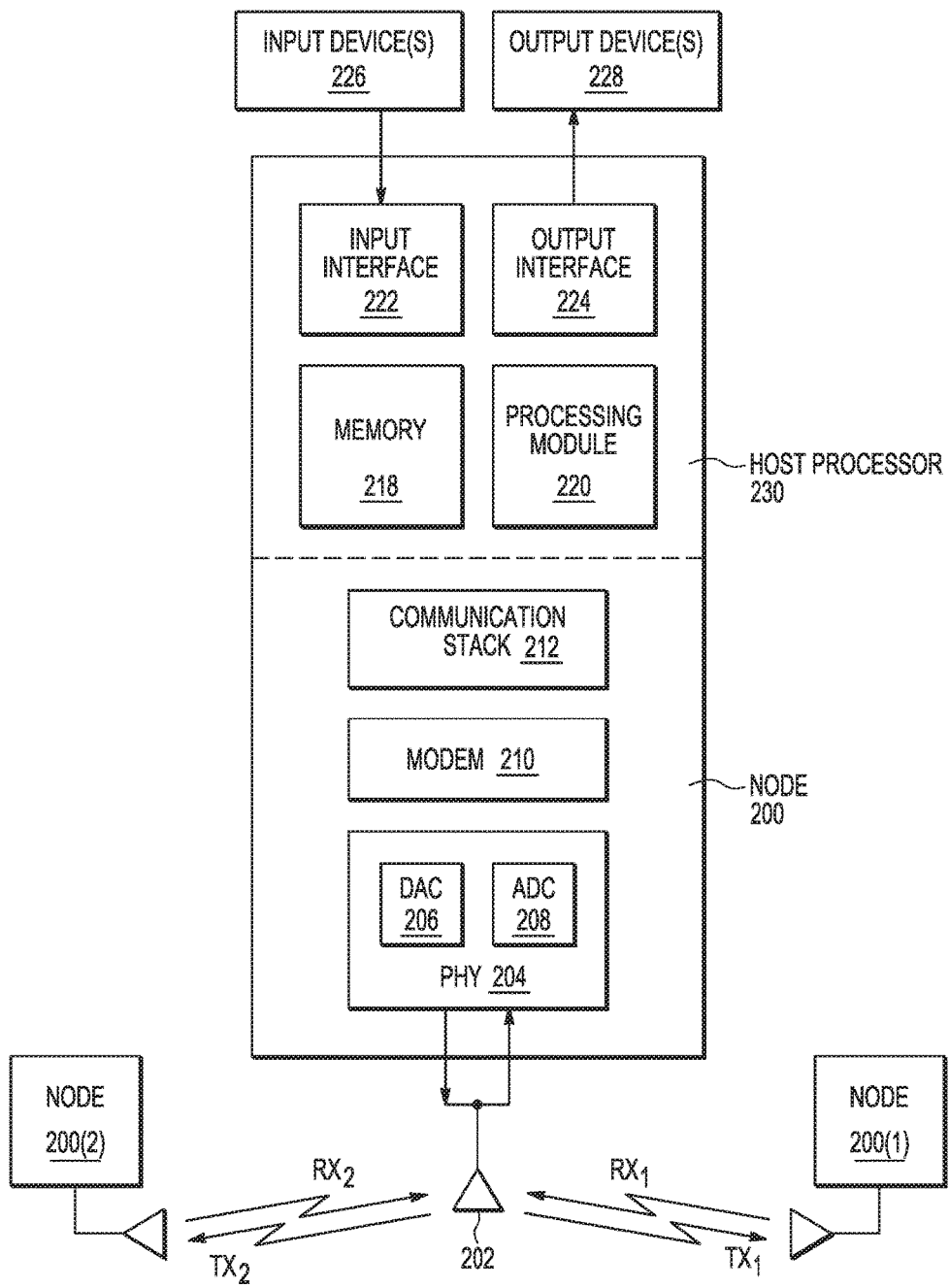
FIG. 2 illustrates a block diagram depicting selected components of an example node of a wireless communication system in which the disclosure is implemented, according to some embodiments.

FIG. 2 illustrates a block diagram depicting selected components of an example node 200 of wireless communication system 100. In some embodiments, node 200 includes host processor 230 on a same device and may be utilized as a routing node, such as for nodes 110, 115, and 120(1)-(4). In other embodiments, node 200 does not include host processor 230 on a same device, but instead includes an interface (shown as broken line between node 200 and host processor 230) for communication with host processor 230. In such embodiments, node 200 may be utilized as an end device, such as for nodes 120(5)-(7).

Node 200 includes an antenna 202, a physical (PHY) layer module 204, a digital-to-analog converter (DAC) 206, an analog-to-digital converter (ADC) 208, a modem 210, and a communication stack module 212. Node 200 can be characterized as a receiver, as a transmitter, or both such as a transceiver. Node 200 is multi-rate compatible. While not shown, node 200 also includes a power supply unit (e.g., a battery) and additional components, such as radio-frequency or baseband circuits, digital circuits, sensors, actuators, and the like. As will be appreciated, one or more of the modules of node 200 may be implemented with dedicated hardware, alone or in combination with a processor and associated memory for storing and executing instructions that control access to the physical transmission medium in the WPAN.

Host processor 230 includes a processing module 220, memory 218, input interface 222, and output interface 224. Processing module 220 and memory 218 cooperate to provide the specified host functionality (e.g., a cell phone communication function according to a particular cellular telephone standard). Input interface 222 provides connectivity from an input device such as a keyboard, keypad, microphone, an external processor bus, and the like. Output interface 224 provides connectivity to an output display device, such as a display, monitor, speakers, an external processor bus, and the like. It will be appreciated that other components and configurations may be used, including but not limited to integrating a high-performance embedded microcontroller with associated program and data memory.

Figure 4:
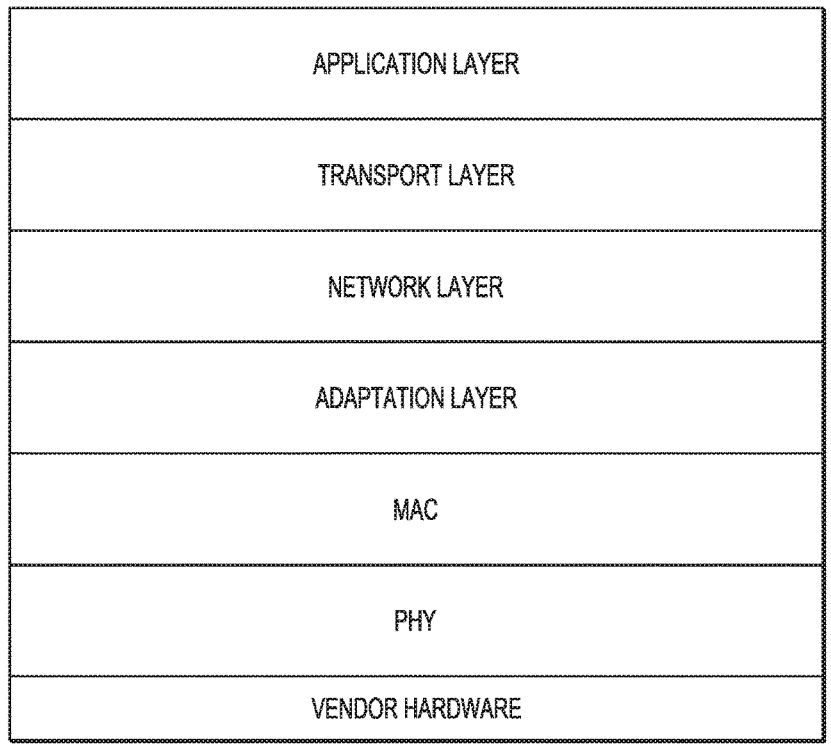
FIG. 4 illustrates a block diagram depicting an example communication protocol stack in which the disclosure is implemented, according to some embodiments.

Outgoing and incoming communication is governed by various communication protocols configured on both host processor 230 and node 200. The various communication protocols define rules at one or more layers of a communication protocol stack, which includes a hierarchy of layers, each layer interacting with its neighboring layers. Protocols at lower layers of the communication protocol stack define hardware interaction, while protocols at higher layers of the communication protocol stack define application interaction. An example communication protocol stack is illustrated in FIG. 4, which includes a physical (PHY) layer that interacts with hardware (e.g., hardware of node 200), a media access control (MAC) layer, an adaptation layer, a network layer, a transport layer, and an application layer. The protocols of the communication protocol stack work together to provide communication functionality. For example, the legacy protocol defines rules at both the PHY and MAC layers, which interacts with rules defined by other protocols at other layers, such as with 6LoWPAN (Internet Protocol v6 over Low power WPAN) at the adaptation layer, which in turn interacts with Internet Protocol at the network layer. The present disclosure implemented on node 200 provides modifications to the legacy protocol at the PHY layer, and is accordingly compatible with higher level layers, including 6LoWPAN at the adaptation layer.

In some embodiments, rules at the PHY and MAC layers are implemented on node 200, while higher level layers are implemented on host processor 230. In other embodiments, a different number of layers may be implemented on node 200, with the remaining layers implemented on host processor 230. PHY module 204 of node 200 is configured to implement rules at the PHY layer, while communication stack module 212 of node 200 is configured to implement rules at the remaining layers of the communication protocol stack configured on node 200. These layers include the MAC layer, and may also include one or more next higher layers in some embodiments. PHY module 204 and communication stack module 212 together perform communication protocol functions that include, but are not limited to, receipt processing, transmission processing, spread modulation, spread demodulation, encoding, decoding, digital modulation (such as O-QPSK (offset quadrature phase shift keying) modulation, filtered FSK (frequency shift keying) modulation, and the like), digital demodulation (such as O-QPSK demodulation, filtered FSK demodulation, and the like), CRC coding, and error detection. In some embodiments, the digital modulation and digital demodulation utilize a particular type of O-QPSK modulation and demodulation as specified or adopted by the legacy IEEE 802.15.4 protocol.

Node 200 is configured to join the WPAN, such as on startup of node 200. Node 200 exchanges information with its neighboring nodes in the WPAN. For each neighboring node, a data rate for communication with that neighboring node is selected based on whether the neighboring node is also multi-rate compatible and whether the communication link with the neighboring node supports one or more data rates. The data rates may be selected from the legacy data rate, or one of a number of non-legacy data rates, which include data rates that are faster than the legacy data rate, slower than the legacy data rate, or both. Both nodes use the selected data rate during communication with each other. Data rate selection is further discussed below in connection with FIG. 8.

For an outgoing communication or transmission, data may be received at processing module 220 from input device 226 via input interface 222, or data may be generated by processing module 220. Processing module 220 may perform data processing (e.g., a host function) on the data. Processing module 220 may also provide the data to node 200 (e.g., either directly or via an interface) for transmission to another node, such as TX1 to node 200(1) or TX2 to node 200(2). Communication stack module 212 ensures the data is in an appropriate format for an outgoing communication, per the protocols configured on node 200. In some embodiments, communication stack module 212 processes the data to be included in a MAC frame or other appropriate type of frame. In other embodiments, the host processor 230 provides the data in a MAC frame or other appropriate type of frame to node 200.

Communication stack module 212 also encapsulates the data in a payload of a PHY frame. If the legacy data rate is selected for communication with the destination node, communication stack module 212 utilizes the legacy PHY frame structure defined by the legacy protocol, which also includes a legacy SHR and a legacy PHR. If a non-legacy data rate is selected for communication with the destination node (which may be indicated by a corresponding PSDU Config ID associated with the destination node), communication stack module 212 utilizes the non-legacy PHY frame, which includes a non-legacy SHR and a non-legacy PHR, as discussed above in connection with FIG. 5. Communication stack module 212 then provides the PHY frame (whether legacy or non-legacy) to modem 210 for spread modulation.

Modem 210 performs modulation of the PHY frame according to the selected modulation configuration. If the legacy modulation configuration (that implements the legacy data rate) is selected, modem 210 performs spread modulation of the legacy PHY frame per the legacy protocol, such as by using the legacy chip mapping to spread modulate the entire legacy PHY frame. If a non-legacy modulation configuration (that implements a non-legacy data rate) is selected, modem 210 performs spread modulation of the SHR and PHR of the non-legacy PHY frame using the legacy chip mapping, and performs modulation of the PSDU of the non-legacy PHY frame according to the selected non-legacy modulation configuration. If the non-legacy modulation configuration provides a particular non-legacy chip mapping, modem 210 performs spread modulation of the PSDU using the non-legacy chip mapping. If the non-legacy modulation configuration provides an encoding scheme, modem 210 encodes the PSDU using the non-legacy encoding scheme, without performing spread modulation. In some embodiments, modem 210 may include one or more modems, each modem configured to implement one of the various modulation configurations (e.g., one modem to perform legacy modulation, another modem to perform 4-bit symbol to 16-chip modulation, another modem to perform 2-bit symbol to 4-chip modulation, another modem to perform differential encoding, another modem to perform pilot encoding, and so on). Modem 210 then provides the modulated frame (whether legacy or non-legacy) to PHY module 204.

PHY module 204 performs O-QPSK modulation on the entire frame, which is then provided to DAC 206 for conversion to an analog signal if the modulated frame has not yet been converted to the analog signal during the modulation process. The analog signal may also be gained and filtered and passed to the antenna 202 for transmission to the destination node. The transmission process implemented by a multi-rate capable node is further discussed below in connection with FIG. 6.

For an incoming communication or transmission, data may be received at antenna 202 as an analog signal from another node, such as RX1 from node 200(1) or RX2 from node 200(2). The analog signal is passed to PHY module 204, which is gained, filtered, and digitized into a digital signal by ADC 208. PHY module 204 processes the digital signal into a PHY frame and performs O-QPSK demodulation on the frame. PHY module 204 then provides the PHY frame to modem 210.

Modem 210 performs spread demodulation of the SHR of the PHY frame using the legacy chip mapping. Modem 210 extracts the SFD of the SHR. If the SFD is a legacy SFD (e.g., the SFD matches the legacy SFD), the PHY frame is identified as a legacy PHY frame and modem 210 performs spread demodulation of the rest of the legacy PHY frame using the legacy chip mapping. If the SFD is a non-legacy SFD (e.g., the SFD matches the non-legacy SFD), the PHY frame is identified as a non-legacy PHY frame and modem 210 performs spread demodulation of the PHR of the non-legacy frame using the legacy chip mapping. Modem 210 then extracts the PSDU Config identifier to determine the appropriate non-legacy modulation configuration for the PSDU. In some embodiments, modem 210 may discard the frame if the extracted PSDU Config identifier is not supported by modem 210. Modem 210 performs demodulation of the PSDU of the non-legacy PHY frame according to the non-legacy modulation configuration, which may include performing spread demodulation using an associated non-legacy chip mapping or may include decoding the PSDU using an associated decoding scheme. The demodulated frame (whether legacy or non-legacy) is then provided to communication stack module 212.

Communication stack module 212 de-encapsulates the data carried in the PHY frame (whether legacy or non-legacy) and provides the data in an appropriate format to host processor 230 (e.g., directly or via an interface). Processing module 220 may perform data processing (e.g., a host function) on the data. Processing module 220 may also provide data to output interface 224 for display on an output device 228. The receipt process implemented by a multi-rate capable node is further discussed below in connection with FIG. 7.

Figure 3:
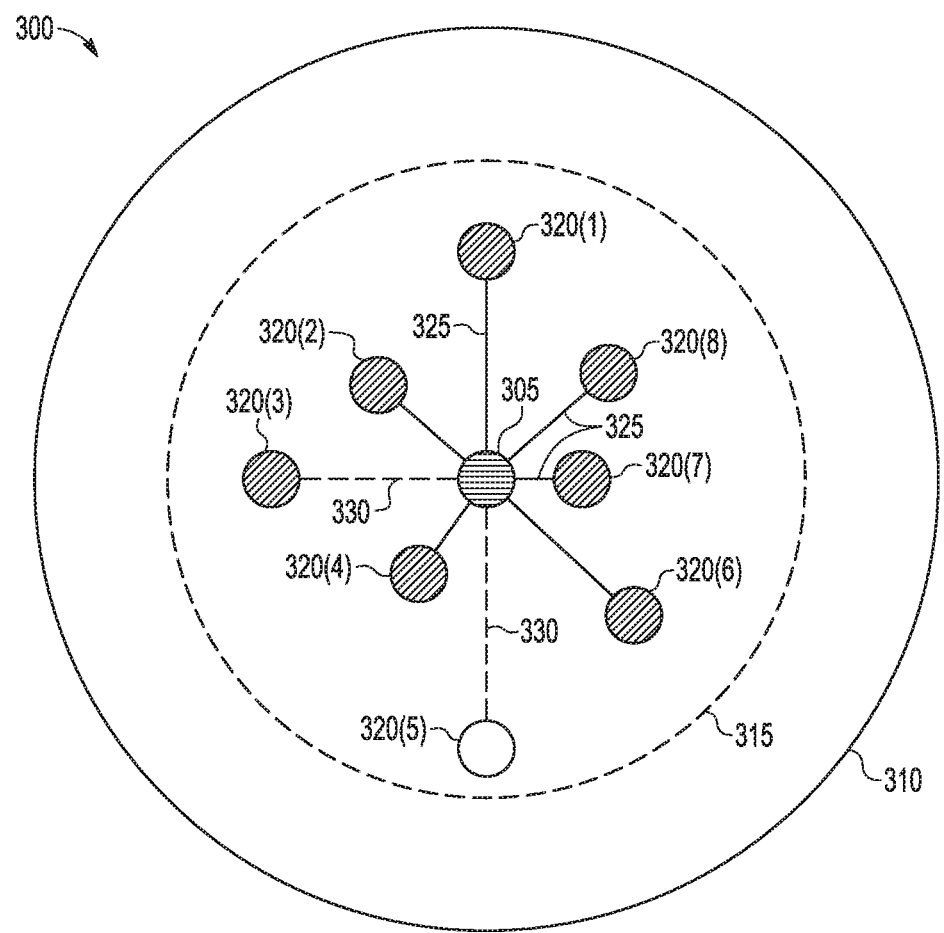
FIG. 3 illustrates a block diagram depicting example communication between a transmitting node having multi-rate overlay mode functionality and neighboring nodes, according to some embodiments.

FIG. 3 illustrates a block diagram depicting example communication between a transmitting multi-rate capable node 305 and neighboring nodes 320(1)-(8). Nodes 320(1)-(4) and nodes 320(7)-(8) are multi-rate capable nodes (and are configured with both the legacy protocol and the multi-rate extension mechanism), while nodes 320(5) and 320(6) are only legacy capable (and are configured with the legacy protocol). Node 305 is configured to communicate with each neighboring node via a respective communication link. Node 305 is configured to detect metrics regarding each communication link, such as a link quality indicator (LQI) that reflects the signal strength or performance of the communication link, and determine whether the communication link is capable of supporting one or more data rates. The metrics may include distance between the nodes as a proxy for link quality. The metrics may also reflect whether some links have high interference, such as crosstalk or other unwanted signal sources.

Based on these metrics, node 305 is configured to determine that some communication links are only capable of supporting the legacy data rate, and are illustrated as dotted lines in FIG. 3. Node 305 is coupled to each of multi-rate capable node 320(3) and legacy-only node 320(5) via a legacy-only communication link 330. As such, node 305 is limited to using legacy data rate communication with nodes 320(3) and 320(5), despite node 320(3) being multi-rate capable. Other communication links are capable of supporting data rates higher than the legacy data rate, and are illustrated as solid lines in FIG. 3. Node 305 is coupled to each of nodes 320(1)-(2), 320(4), and 320(6)-(8) via a multi-rate capable communication link 325. However, node 205 is again limited to using legacy data rate communication with node 320(6) since node 320(6) is a legacy-only node, despite the respective communication link being capable of supporting a faster data rate.

Node 305 and each respective neighboring node may select a data rate for communication on their respective communication link. For example, node 305 and 320(1) may select one of the non-legacy data rates that are faster than the legacy data rate. However, node 305 and each respective neighboring node may instead select the legacy data rate for communication, depending on whether increased sensitivity or other need is required.

A signal transmitted by node 305 to its neighboring nodes has a signal strength that falls off as the signal travels farther away from node 305. The signal has a detection range 310, where the signal is strong enough to be detected by other nodes that are within the detection range 310. The signal also has a demodulation range 315, where the signal is strong enough to be demodulated by the other nodes that are within the demodulation range 315. Detection range 310 is designed to have a larger range than demodulation range 315, in order to ensure that the nodes are able to successfully detect incoming signals and avoid missed packets. The detection range 310 and demodulation range 315 may change, depending on the modulation configuration implemented, as further discussed in connection with FIGS. 10 and 11.

Figure 10:
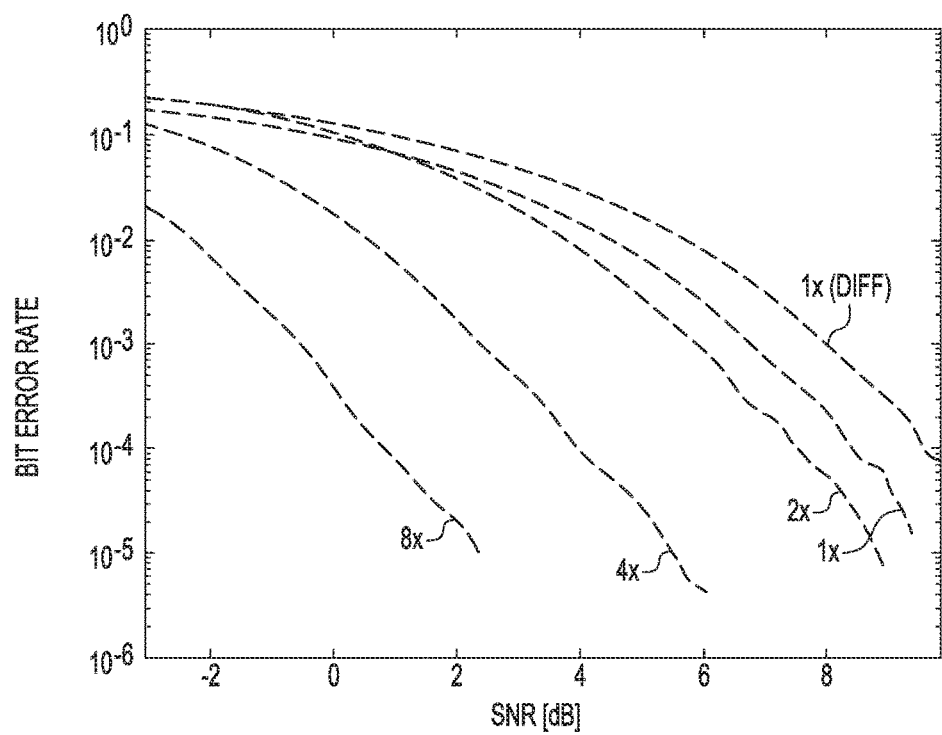
FIGS. 10 and 11 illustrate graphs depicting example error rates during implementation of multi-rate overlay mode functionality, according to some embodiments.
Figure 11:
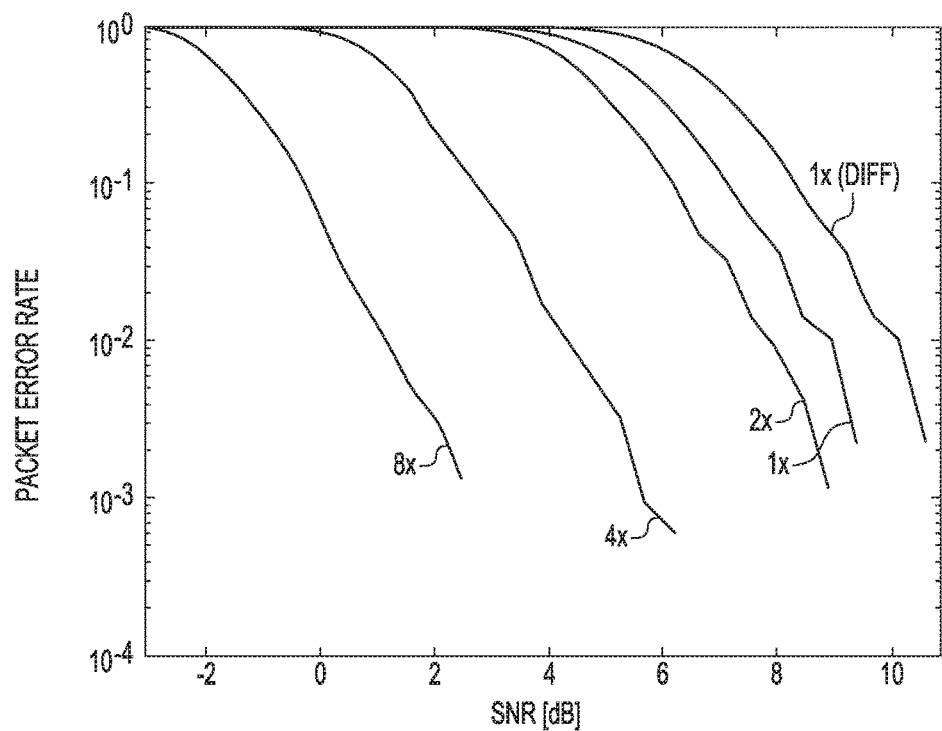

FIGS. 10 and 11 illustrate graphs depicting example error rates as a function of PSDU modulation during implementation of multi-rate overlay mode functionality. For example, FIG. 10 illustrates bit error rate (BER) versus signal-to-noise ratio (SNR) for the PSDU spreading factor associated with each of the legacy modulation configuration (e.g., spreading factor of 8×) and example non-legacy modulation configurations (e.g., spreading factors of 4×, 2×, 1×, and 1× diff). It is noted that each non-legacy modulation configuration improves the SNR of the signal as compared to the legacy modulation configuration. Similarly, FIG. 11 illustrates packet error rate (PER) versus SNR for the PSDU spreading factor associated with each of the legacy modulation configuration and non-legacy modulation configurations. Again, it is noted that each non-legacy modulation configuration improves the SNR of the signal as compared to the legacy modulation configuration. For example, the legacy modulation configuration has a preamble detection margin of about 2.3 dB. In comparison, the non-legacy modulation configurations have a respective preamble detection margin of 5.5 dB for spreading factor of 4×, 9 dB for spreading factor of 2×, 10 dB for spreading factor of 1× using pilots, and 11.2 dB for spreading factor of 1× differentially coded.

It is also noted that as the demodulation SNR requirement of the transmitted signal is higher due to an increased data rate, the effective range of the signal decreases. Accordingly, the detection range and demodulation range grows smaller as each non-legacy modulation configuration requires a higher SNR of the transmitted signal for reliable demodulation. This allows the transmitting node to select a particular non-legacy modulation configuration to target a transmission for a particular receiving node, where the non-legacy modulation configuration implements a detection range that includes the particularly targeted receiving node, but also excludes a number of nodes that are beyond the detection range for the chosen non-legacy modulation configuration and do not need to receive the specific transmission. Further, the nodes that are excluded from the detection range do not waste energy detecting or demodulating a transmission that is not intended for them, which saves battery life of the nodes. It is also noted that a low SNR indicates that the signal can withstand more noise at a greater range, indicating that the legacy data rate may still be selected to reach distant nodes, even if those nodes are multi-rate capable. Further, in some embodiments, the non-legacy data rates include one or more data rates that are slower than the legacy data rate, which may be selected to achieve a range larger than the legacy range.

Since signal detection range is reduced when utilizing one of the non-legacy modulation configurations, the probability of the legacy preamble detection by the receiving nodes is also improved, which enables a receiving node to perform synchronization efficiently (e.g., using a set of three or more initial preamble symbols, assuming that the receiving node requires detection of at least three consecutive symbols of the preamble to declare successful preamble detection). However, a synchronized receiving node must still wait for the remaining preamble sequence to be received before it can move on to SHR demodulation and SFD detection. In order to optimize over-the-air efficiency of a receiving node that has reliable preamble detection for a chosen PSDU modulation configuration, the present disclosure provides an embodiment where the length of the preamble sequence included in a non-legacy frame is variable, chosen based on the non-legacy modulation configuration selected, where the preamble may be from three to eight symbols long. Such shorter preamble length also results in a shorter non-legacy SHR, which still includes the non-legacy SFD. Shortened preamble length is further discussed below in connection with FIG. 9.

Figure 9:
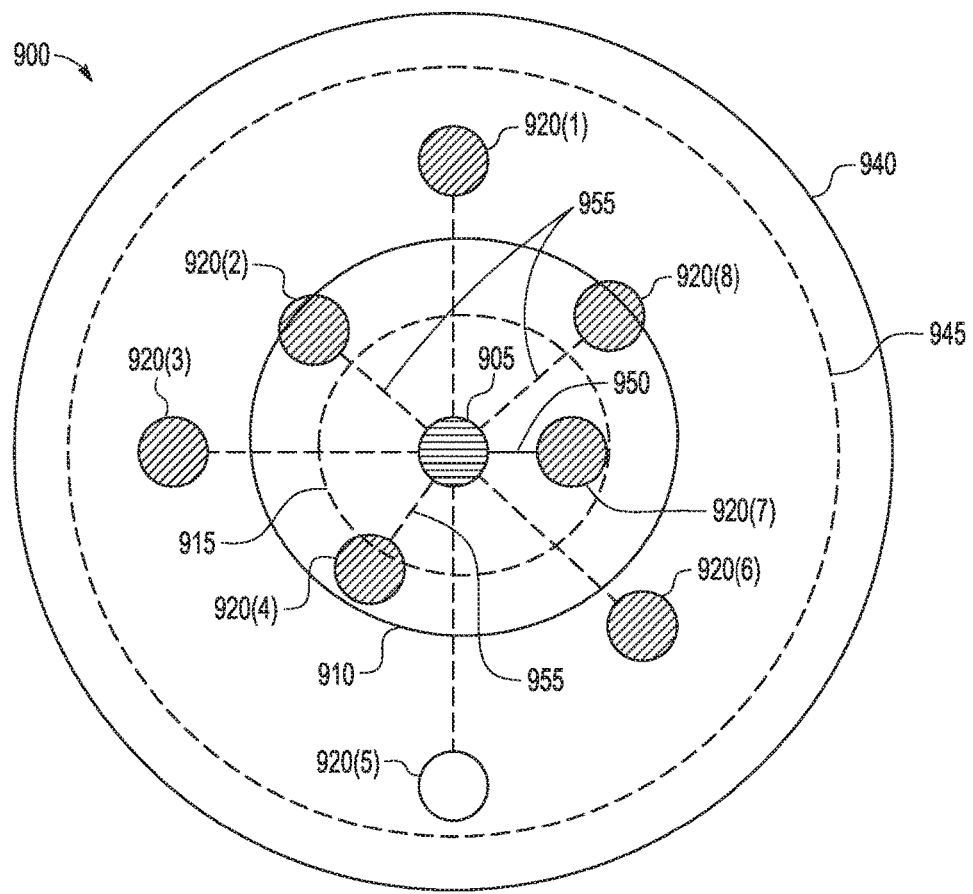
FIG. 9 illustrates a block diagram depicting example communication between a transmitting node having another embodiment of multi-rate overlay mode functionality and neighboring nodes.

FIG. 9 illustrates a block diagram depicting example communication between a multi-rate capable node 905 that is transmitting to a targeted neighboring node 920(7) from among neighboring nodes 920(1)-(8). Nodes 920(1)-(4) and nodes 920(7)-(8) are multi-rate capable nodes (which includes legacy protocol capable), while nodes 920(5) and 920(6) are only legacy protocol capable. Node 905 is coupled to node 920(7) via a multi-rate capable communication link 950, illustrated as a solid line. Node 905 and node 920(7) have selected a non-legacy data rate for communication with one another, such as the maximum non-legacy data rate (e.g., 2 Mbps) implemented by one of the non-legacy modulation configurations. Each of the remaining nodes 920(1)-(6) and 920(8)-(9) are coupled to node 905 via a communication link 955, illustrated as dotted lines, which indicates that node 905 and each of the remaining nodes have selected a slower data rate (i.e., slower than the maximum non-legacy data rate selected for node 920(7)) for their respective communication (e.g., node 905 and 920(5) have selected the legacy data rate, while node 905 and node 920(6) have selected a moderate non-legacy data rate that is slower than the maximum non-legacy data rate).

Transmitting node 905 begins transmitting a signal that carries a frame, which includes the non-legacy synchronization header and non-legacy protocol header that has been modulated according to the legacy modulation scheme. As such, the transmitted signal has a legacy detection range 940 and a legacy modulation range 945 that corresponds to the legacy modulation scheme. All nodes 920(1)-(8) are located within the detection and demodulation ranges, and all nodes 920(1)-(8) detect the signal and demodulate the non-legacy synchronization header (SHR), where the non-legacy SHR of the frame is received at the legacy data rate. Any receiving legacy-only capable nodes will detect a non-legacy start-of-frame delimiter (SFD) in the non-legacy SHR and will discard the frame. Any receiving multi-rate capable nodes will continue to demodulate the non-legacy protocol header (PHR) of the signal, where the non-legacy PHR of the frame is also received at the legacy data rate. The non-legacy protocol header includes a PSDU Config ID that indicates a non-legacy data rate is selected (e.g., the maximum non-legacy data rate). In some embodiments, any receiving multi-rate capable node will discard the frame if the PSDU Config ID indicates a non-legacy modulation scheme that is not supported by the receiving multi-rate capable node.

Transmitting node 905 continues transmitting the signal that carries the frame, which includes the data payload that has been modulated according to a selected non-legacy modulation scheme. At this point, the choice of non-legacy modulation scheme results in the receiving node requiring a higher SNR of the transmitted signal and hence the range of the signal transmission decreases, which is illustrated as non-legacy detection range 910 (which is smaller than legacy detection range 940) and non-legacy demodulation range 915 (which is smaller than legacy demodulation range 945). The present signal is strong enough to be detected and demodulated by nodes that are within non-legacy demodulation range 915, which is only node 920(7), where the data payload of the frame is received at the selected non-legacy data rate. It is noted that nodes 920(1), 920(3), 920(5), and 920(6) are outside of both the present detection range 910 and demodulation range 915 when node 905 transmits the data payload to node 920(7), and do not waste energy by continuing to detect and demodulate the transmission that is not intended for them. Similarly, nodes 920(2), 920(4), and 920(8) are outside of the present demodulation range 915, but within the non-legacy detection range 910. These nodes would therefore detect the transmission of a packet in the non-legacy mode by node 905, but would not be able to successfully decode the transmitted PSDU, potentially indicated by a failed integrity check of the contents of the PSDU. These nodes do not waste energy by further processing the PSDU (e.g., MAC processing) since transmission is not intended for them. In this manner, the transmitting node 905 is able to select a particular non-legacy modulation configuration to target a transmission for a particular receiving node, node 920(7).

It is also noted that since the selected non-legacy modulation configuration has a higher SNR of the transmitted signal, the receiving node 920(7) has an improved probability of preamble detection. The transmitting node 905 may take advantage of this improvement and opt to have a minimal preamble length (e.g., at least three symbols or more) to minimize the overhead margin of the receiving node 920(7) (e.g., wasted time waiting for receipt of the remaining preamble symbols). A shorter preamble length may be selected by the determining node (e.g., the transmitting node) during the information exchange process illustrated in FIG. 8, where the shorter preamble length is used during communication with the neighboring node (such as node 920(7)). Since the duration of the preamble is shortened, the over-the-air activity of the transmitting node and the receiving node is also shortened, extending the battery life of the nodes and improving over-the-air efficiency of the transmission network.

The transmitting node 905 may also opt to have a preamble length longer than the required minimal preamble length in order to compensate for a sub-optimal receiving node. For example, the transmitting node may opt to include a moderate preamble length (e.g., six symbols) to provide a long enough preamble sequence for the receiving node to successfully synchronize to the preamble. The transmitting node may also take the carrier frequency offset (CFO), caused by frequency drift between various nodes, into consideration when determining a preamble length, where a longer preamble may lead to a better CFO estimate, which improves the demodulation performance of the receiving node. While the non-legacy frame that includes a preamble length of six symbols is not as short as a non-legacy frame that includes, for example, a preamble length of three symbols, any reduction in preamble length results in a shorter duration non-legacy frame, which provides over-the-air overhead savings. Shortening over-the-air communications is also important for network capacity (e.g., avoiding bottlenecks in the WPAN by minimizing over-the-air communication resources). A particular preamble length may be selected by the determining node (e.g., the transmitting node) during the information exchange process illustrated in FIG. 8, where the particular preamble length is used during communication with the neighboring node (such as node 920(7)).

Figure 12:
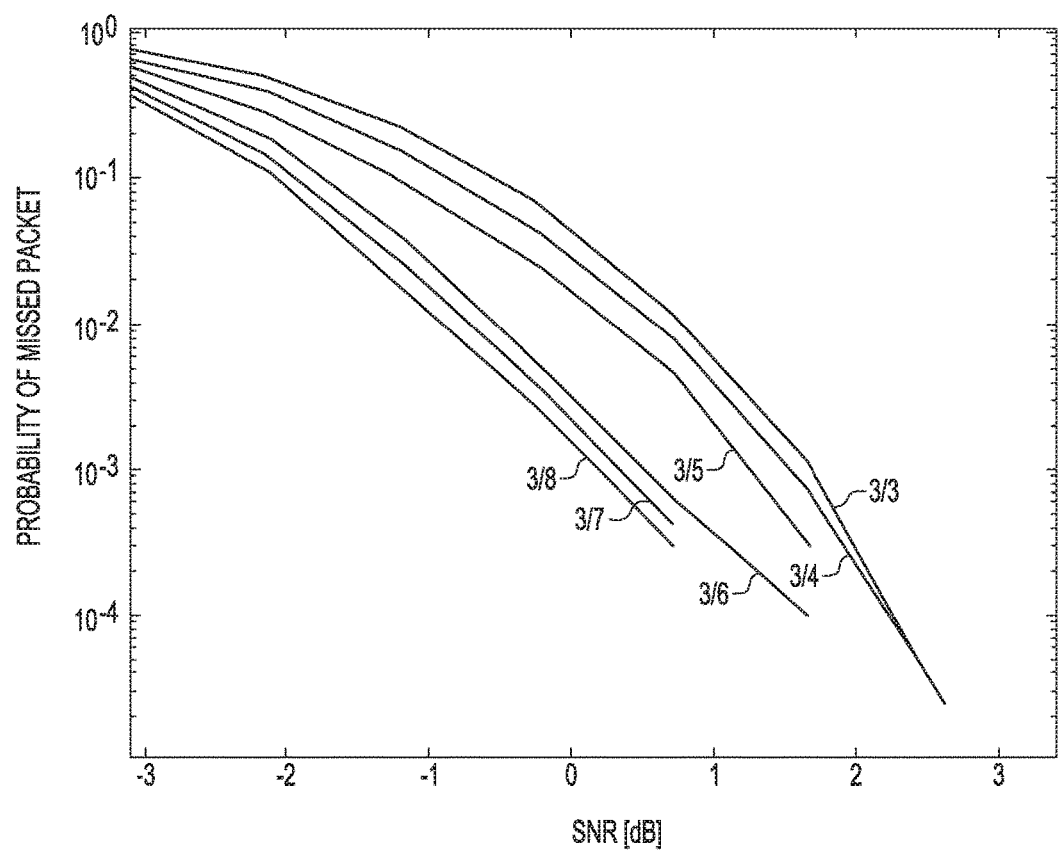
FIG. 12 illustrates a graph depicting example probabilities of missed packets for some embodiments of multi-rate overlay mode functionality.

FIG. 12 illustrates a graph depicting example probabilities of missed packets for embodiments of the multi-rate overlay mode functionality that implement shorter preamble lengths. As illustrated, FIG. 12 illustrates a missed packet detection rate versus SNR for a number of non-legacy modulation configurations that implement N preamble symbols. As shown, a minimum of three preamble symbols are required to be detected in order for successfully synchronization by a receiving node. A number of missed packet detection curves are illustrated, each for a different preamble symbol length included in a synchronization header of a non-legacy frame that carries packet data. For example, one missed packet detection curve is illustrated for a preamble symbol length of eight symbols (e.g., consecutive 3 out of the 8 transmitted symbols have to be received for reliable packet detection), while another missed packet detection curve is illustrated for a preamble symbol length of three symbols (e.g., 3 of the 3 symbols have to be received). As illustrated, the overall probability of missed packet detection does not degrade very significantly, shown as a performance degradation of 2 to 3 dB, even as the number of preamble symbols is reduced by more than half.

Figure 6:
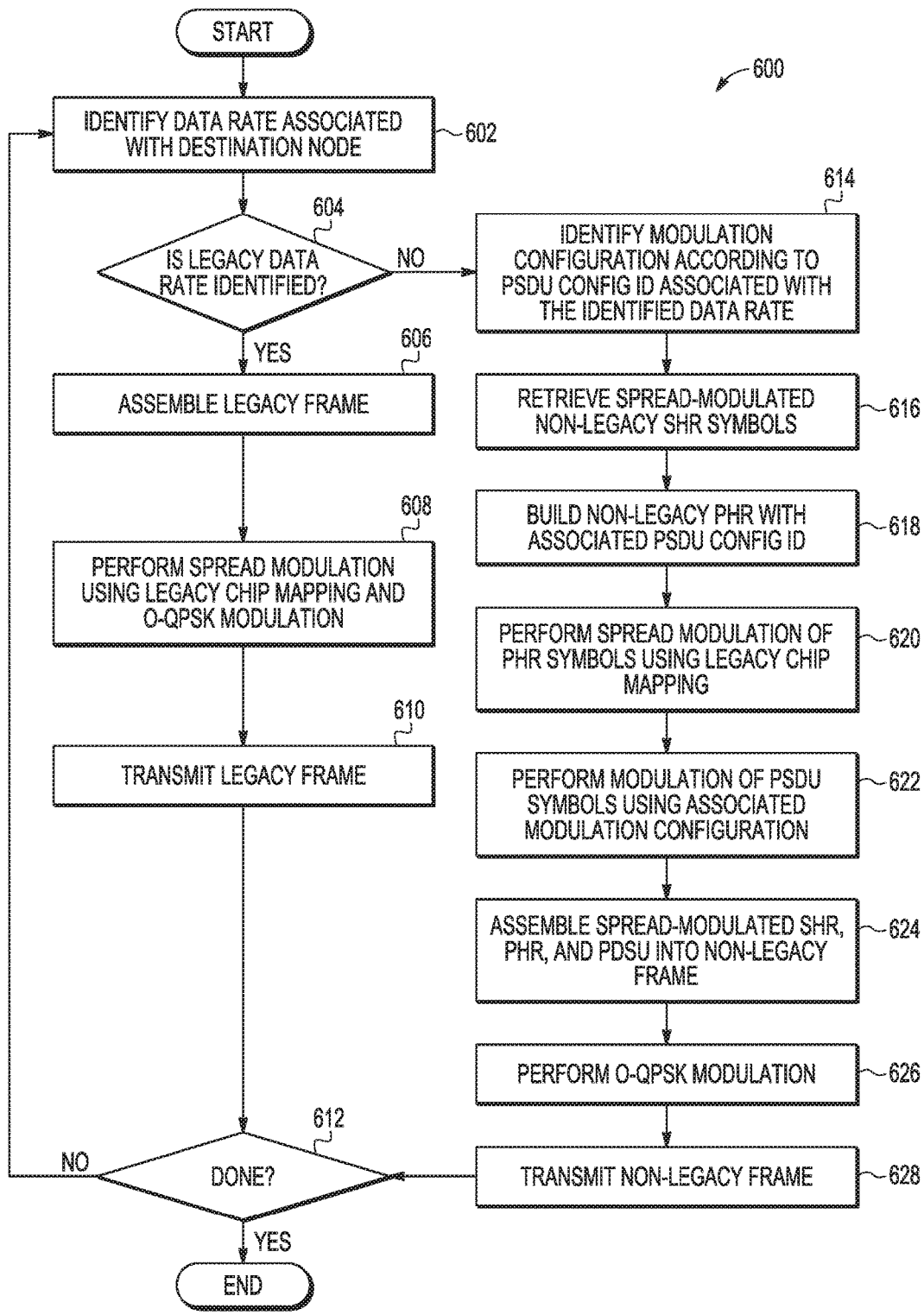
FIG. 6 illustrates a flowchart depicting a transmission process implemented by a node having multi-rate overlay mode functionality, according to some embodiments.

FIG. 6 illustrates a flowchart depicting a transmission process 600 implemented by a multi-rate capable node for transmitting data to a neighboring node in the WPAN. The process illustrated in FIG. 6 may be repeated multiple times to fragment a packet into multiple legacy frames (e.g., each having a data payload length of up to 127 bytes) or multiple non-legacy frames (e.g., each having a data payload length of up to 2 kb), depending on the data rate selected for communication with the destination neighboring node. The process starts at operation 602, where the node identifies the data rate associated with the destination node. Selection of the data rate associated with the destination node is further discussed below in connection with FIG. 8.

The process continues to operation 604, where the node determines whether the identified data rate is the legacy data rate. If so, the node performs transmission of a legacy frame to the neighboring node. The process continues to operation 606, where the node assembles the legacy frame, including a legacy SFD in the SHR. The process continues to operation 608, where the node performs spread modulation on the entire legacy frame using the legacy chip mapping and O-QPSK modulation. The process continues to operation 610, where the node transmits the legacy frame. The process continues to operation 612, where the node determines whether there is any remaining data that requires another frame for transmission to the neighboring node. If so, the process returns to operation 602. Otherwise, the process ends.

Returning to operation 604, if the identified data rate is not the legacy data rate, then the node has determined that a non-legacy data rate is identified. Each non-legacy data rate is associated with a unique PSDU Config identifier (ID). The process continues to operation 614, where the node identifies the non-legacy modulation configuration (which includes a non-legacy chip mapping) according to the PSDU Config ID associated with the identified non-legacy data rate. The process continues to operation 616, where the node retrieves a spread-modulated non-legacy SHR for inclusion in the non-legacy PHY frame. As discussed above, the non-legacy SHR includes a non-legacy SFD, where the non-legacy SHR is spread modulated using the legacy chip mapping. In order to expedite frame assembly, spread modulation is performed on the non-legacy SHR using the legacy chip mapping at some time previous to the process illustrated in FIG. 6, and then the spread-modulated non-legacy SHR is later retrieved in operation 616. In other embodiments, the spread-modulated non-legacy SHR may be generated in spread-modulated form in operation 616, also in order to expedite spread modulation of the frame.

In some embodiments, the spread-modulated non-legacy SHR retrieved in operation 616 is one of a number of possible spread-modulated non-legacy SHRs that have different preamble lengths. For example, one spread-modulated non-legacy SHR may include the chip equivalent of eight preamble symbols, while another spread-modulated non-legacy SHR may include the chip equivalent of fewer than eight preamble symbols (e.g., seven preamble symbols or three preamble symbols). Each spread-modulated non-legacy SHR is associated with one of the non-legacy data rates, where the retrieved spread-modulated non-legacy SHR is associated with the identified non-legacy data rate. Shorter preamble length is further discussed above in connection with FIG. 9.

The process continues to operation 618, where the node builds a non-legacy PHR, which includes the associated PSDU Config ID associated with the identified non-legacy data rate. The non-legacy PHR also includes a PSDU length that reflects the amount of data being transmitted in the payload of the non-legacy frame, as well as a header check sequence (HCS) generated by the node to protect the PHR contents. The process continues to operation 620, where the node performs spread modulation of the PHR using the legacy chip mapping. The process continues to operation 622, where the node generates a data payload structure (or PSDU) for the non-legacy frame, which includes the data to be transmitted, and performs modulation of the PSDU using the non-legacy modulation configuration identified in operation 614.

The process continues to operation 624, where the node assembles the spread-modulated SHR, spread-modulated PHR, and modulated (either spread-modulated or encoded) PSDU into a non-legacy frame. The process continues to operation 626, where the node performs O-QPSK modulation on the non-legacy frame assembled in operation 624. The process continues to operation 628, where the node transmits the non-legacy frame. The process then continues to operation 612, as discussed above.

Figure 7:
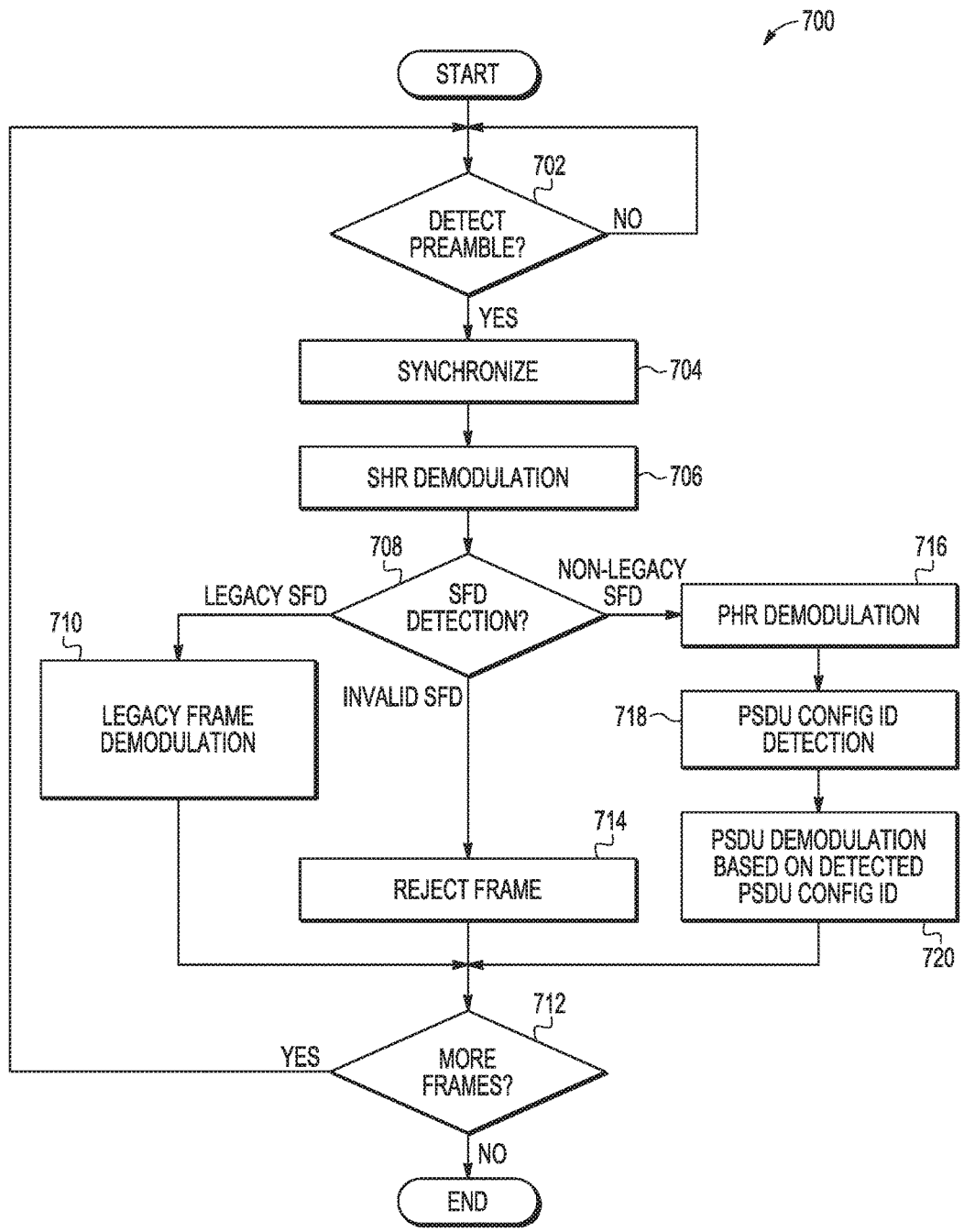
FIG. 7 illustrates a flowchart depicting a receipt process implemented by a node having multi-rate overlay mode functionality, according to some embodiments.

FIG. 7 illustrates a flowchart depicting a receipt process 700 implemented by a multi-rate capable node for receiving a PHY frame that is transmitted from a neighboring node in the WPAN. The process starts at operation 702, where a node determines if a preamble of a PHY frame has been received. If a preamble is not detected, the node continues to wait and check for detection of a preamble. If a preamble is detected, then the node has detected that a PHY frame is being received, and the process continues to operation 704, where the node synchronizes on the preamble. In some embodiments, the preamble has a length either equal to eight symbols or fewer than eight symbols, based on the data rate associated with the PHY frame. The PHY frame being received is either a legacy frame or a non-legacy (or multi-rate) frame.

Once synchronized, the process continues to operation 706, where the node performs SHR demodulation, which includes O-QPSK demodulation and spread demodulation of the SHR using the legacy chip mapping. The process continues to operation 708, where the node performs SFD detection. If the SFD of the received frame is the legacy SFD, then the node has determined that a legacy PHY frame is received, and the process continues to operation 710, where the node performs legacy frame demodulation, which includes performing O-QPSK demodulation and spread demodulation of the rest of the legacy PHY frame (or the PHR and data payload of the legacy PHY frame). Once demodulation of the legacy PHY frame is complete, data may be extracted from the frame. The process then continues to operation 712, where the node determines whether any more frames are being received, such as whether the present frame is one of multiple fragments received for a single packet. If so, the process returns to operation 702. Otherwise, the process ends.

Returning to operation 708 for SFD detection, if the SFD of the received frame is the non-legacy SFD, then the node has determined that a non-legacy PHY frame is received. The process continues to operation 716, where the node performs PHR demodulation, which includes O-QPSK demodulation and spread demodulation of the PHR using the legacy chip mapping. The process continues to operation 718, where the node performs PSDU Config identifier (ID) detection. The node extracts the PSDU Config ID from the demodulated PHR and determines the data rate associated with the PSDU Config ID.

The process configures to operation 720, where the node performs PSDU demodulation, based on the PSDU Config ID extracted during operation 718. PSDU demodulation includes O-QPSK demodulation of the PSDU. PSDU demodulation also includes demodulation of the PSDU according to the non-legacy modulation configuration identified by the PSDU Config ID. The modulation configuration may specify performing spread demodulation of the PSDU using a non-legacy chip mapping, or may specify a decoding scheme for the PSDU (either differentially or using pilots) instead of spread demodulation. Once demodulation of the non-legacy PHY frame is complete, data may be extracted from the frame. The process then continues to operation 712, as discussed above.

Returning to operation 708 for SFD detection, if the SFD of the received frame is not the legacy SFD and not the non-legacy SFD, the node has determined that the received frame has an invalid SFD. The process continues to operation 714, where the node rejects the frame (e.g., discards the frame). The process then continues to operation 712, as discussed above.

Figure 8:
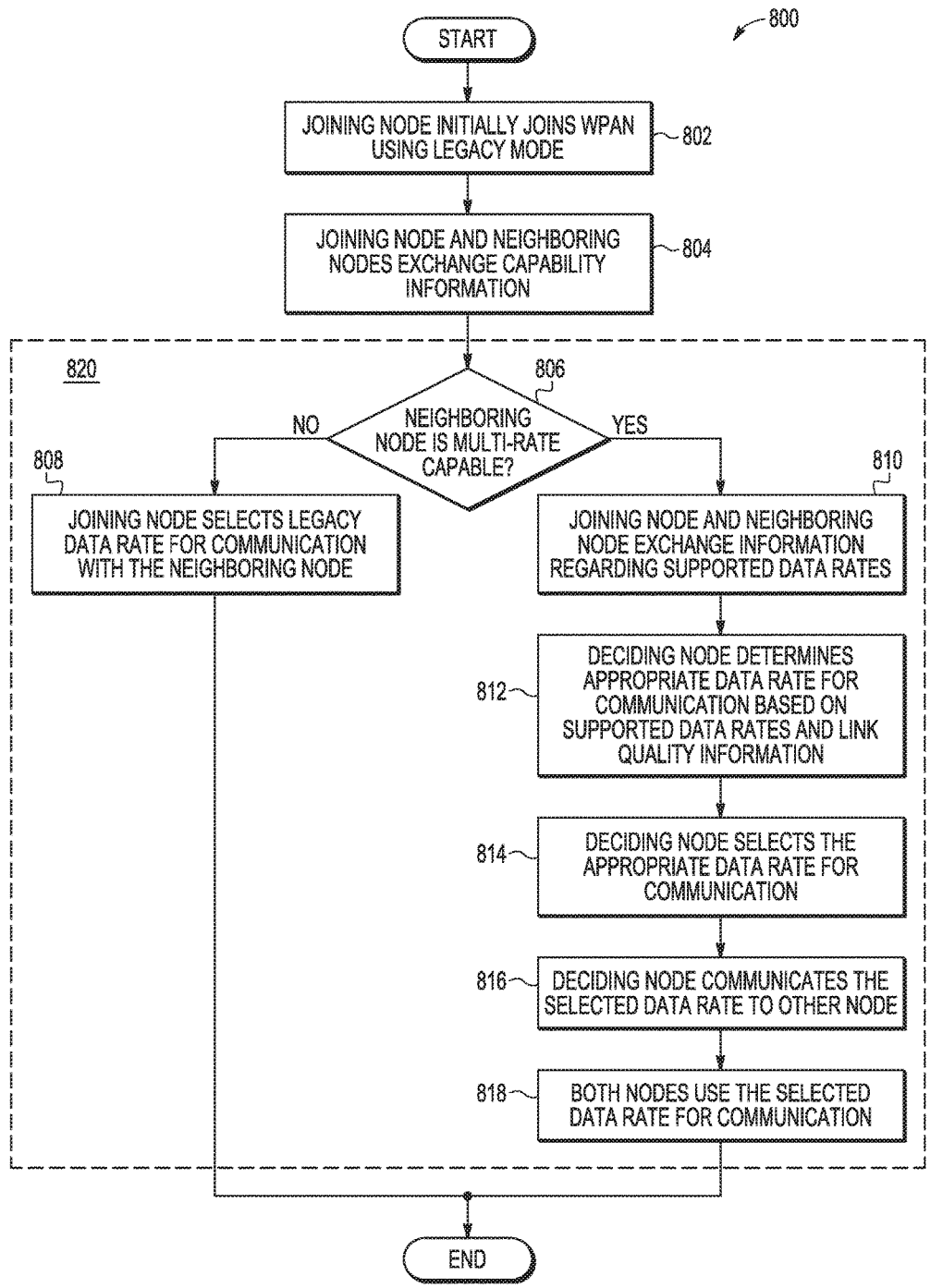
FIG. 8 illustrates a flowchart depicting an information exchange process in which a node having multi-rate overlay mode functionality participates, according to some embodiments.

FIG. 8 illustrates a flowchart depicting an information exchange process 800 in which a multi-rate capable node participates. The process starts at operation 802, where a joining node initially joins the WPAN (e.g. on startup of the node) using the legacy protocol. The process continues to operation 804, where the joining node and neighboring nodes exchange capability information. The next group 820 of operations (outlined by the dotted box) is performed for each neighboring node of the joining node.

The process continues to operation 806, where the joining node determines whether the neighboring node is multi-rate capable, based on the exchanged capability information. If the neighboring node is not multi-rate capable but instead is only legacy capable, the process continues to operation 808, where the joining node selects the legacy data rate for communication with the neighboring node. The process (for this particular neighboring node) then ends.

Returning to operation 806, if the joining node determines that the neighboring node is multi-rate capable, the process continues to operation 810, where the joining node and neighboring node exchange information regarding supported data rates. It is noted that the joining node also obtains link quality information regarding the data rate supported by the communication link with the neighboring node.

The process continues to operation 812, where a deciding node determines an appropriate data rate for communication based on information regarding the data rates supported by the joining node and the neighboring node, as well as link quality information of the communication link between the joining node and the neighboring node. It is noted that either the joining node or the neighboring node may be the deciding node. In some embodiments, the joining node is the deciding node. For example, the joining node (as the deciding node) initiates operation 810 to obtain data rate information from the neighboring node and proceeds to determine the appropriate data rate for communication with the neighboring node based on the data rate information and link quality information. In other embodiments, the neighboring node is the deciding node. For example, the neighboring node (as the deciding node) detects that the joining node has joined the WPAN. The neighboring node may be attempting to create an alternate network path for the WPAN via the joining node to replace a degrading or unreliable path (e.g., another node exiting the WPAN). The neighboring node then initiates operation 810 to obtain the data rate information from the joining node and proceeds to determine the appropriate data rate for communication with the joining node based on the data rate information and link quality information.

The process continues to operation 814, where the deciding node selects the appropriate data rate for communication. The selection may be based on various link quality metrics, or a proxy of link quality such as distance. The deciding node may determine that a given node is a short distance away from the deciding node and may accordingly select a higher non-legacy data rate. A node that is farther away from the deciding node may result in a lower non-legacy data rate or even the legacy data rate being selected.

The process continues to operation 816, where the deciding node communicates the selected data to the other node. The process continues to operation 818, where both nodes (both the joining node and the neighboring node) use the selected data rate for communication. The process (for that particular neighboring node) then ends.

By now it should be appreciated that there has been provided a multiple data rate (or multi-rate) overlay extension mode (or extension mechanism) to the legacy protocol that provides for using different non-legacy data payload modulation schemes, where each scheme effectively changes the duration of the payload of a non-legacy frame, which changes throughput of the transmitted non-legacy frame and achieves a data transfer rate different than the legacy data transfer rate.

In one embodiment of the present disclosure, a method for frame-based communication processing performed by a first wireless communication device is provided, the first wireless communication device is configured with a legacy wireless communication protocol (legacy protocol) and a multiple data rate (multi-rate) extension mechanism to the legacy protocol. The method includes identifying a data transfer rate associated with a second wireless communication device, where the data transfer rate is identified from a group including a legacy data transfer rate specified by the legacy protocol and a plurality of non-legacy data transfer rates specified by the multi-rate extension mechanism, the legacy data transfer rate is achieved by a legacy modulation scheme specified by the legacy protocol, each of the plurality of non-legacy data transfer rates are achieved by a respective one of a plurality of non-legacy modulation schemes specified by the multi-rate extension mechanism, and each of the plurality of non-legacy data transfer rates are different than the legacy data transfer rate. The method also includes, in response to an identification of a selected non-legacy data transfer rate associated with the second wireless communication device, identifying a selected non-legacy modulation scheme associated with the selected non-legacy data transfer rate; performing modulation of a data payload according to the selected non-legacy modulation scheme to produce a modulated data payload; forming a non-legacy header structure including a non-legacy start-of-frame delimiter (SFD) and an identifier of the selected non-legacy modulation scheme; performing modulation of the non-legacy header structure according to the legacy modulation scheme to produce a modulated non-legacy header structure; and assembling the modulated non-legacy header structure and the modulated data payload into a non-legacy frame having a structure that is different from a legacy frame structure specified by the legacy protocol.

One aspect of the above embodiment provides that the forming the non-legacy header structure includes building a non-legacy synchronization header that includes the non-legacy SFD, and building a non-legacy protocol header that includes the identifier of the selected non-legacy modulation scheme.

A further aspect of the above embodiment provides that the performing modulation of the non-legacy header structure includes performing spread modulation of the non-legacy synchronization header and the non-legacy protocol header according to the legacy modulation scheme.

Another aspect of the above embodiment provides that the method further includes: in response to an identification of the legacy data transfer rate associated with the second wireless communication device, assembling a legacy frame according to the legacy protocol.

Another aspect of the above embodiment provides that the method further includes: performing offset quadrature phase shift keying (O-QPSK) modulation on the non-legacy frame, and transmitting the non-legacy frame to the second wireless communication device, subsequent to the performing O-QPSK modulation.

Another aspect of the above embodiment provides that the legacy modulation scheme includes a 4-bit symbol to 32-chip mapping for performing spread modulation, and the selected modulation scheme includes one of the group includes: spread modulation utilizing a 4-bit symbol to 16-chip mapping, spread modulation utilizing a 2-bit symbol to 4-chip mapping, a differential encoding scheme, and a pilot encoding scheme.

Another aspect of the above embodiment provides that the non-legacy header structure includes a preamble sequence having a length of fewer than eight symbols.

Another aspect of the above embodiment provides that the non-legacy header structure includes a header check sequence (HCS) for at least a portion of the non-legacy header structure.

Another aspect of the above embodiment provides h the legacy protocol includes IEEE 802.15.4 protocol.

Another aspect of the above embodiment provides that the method further includes: in response to a determination that the second wireless communication device is also configured with the multi-rate extension mechanism, exchanging information regarding supported data transfer rates, where the first and second wireless communication devices support two or more different data transfer rates that are faster or slower than the legacy data transfer rate specified by the legacy protocol; determining an appropriate data transfer rate from a group including the two or more different data transfer rates and the legacy data transfer rate, where the determining the appropriate data transfer rate is based on the information regarding supported data transfer rates and link quality information regarding a communication link between the first and second wireless communication devices; communicating the appropriate data transfer rate to the second wireless communication device, where the first and second wireless communication devices are configured to utilize the appropriate data transfer rate during communication between the first and second wireless communication devices.

A further aspect of the above embodiment provides that the method further includes: selecting the appropriate data transfer rate based on a determination that the second wireless communication device is within a detection range achieved by a respective one of the group including the two or more different data transfer rates and the legacy data transfer rate.

In another embodiment of the present disclosure, a method for frame-based communication processing performed by a wireless communication device configured with a legacy wireless communication protocol (legacy protocol) and a multiple data rate (multi-rate) extension mechanism to the legacy protocol is provided. The method includes: performing demodulation on a first portion of a header structure of a received frame according to a legacy demodulation scheme specified by the legacy protocol to produce a demodulated first portion; extracting a start-of-frame delimiter (SFD) from the demodulated first portion; in response to a determination that the SFD is a non-legacy SFD that identifies the received frame as having a non-legacy frame structure specified by the multi-rate extension mechanism that is different from a legacy frame structure specified by the legacy protocol, performing demodulation on a second portion of the header structure of the received frame to produce a demodulated second portion; extracting a modulation configuration identifier from the demodulated second portion; and performing demodulation on a data payload of the received frame according to a modulation configuration identified by the modulation configuration identifier, where the modulation configuration specifies a selected demodulation scheme from among a plurality of non-legacy demodulation schemes supported by the wireless communication device, each of the plurality of non-legacy demodulation schemes is different from the legacy demodulation scheme, and each of the plurality of non-legacy demodulation schemes achieves a data transfer rate different than a legacy data transfer rate achieved by the legacy demodulation scheme.

One aspect of the above embodiment provides that the method further includes: performing offset quadrature phase shift keying (O-QPSK) demodulation on the first portion of the header structure prior to the performing demodulation on the first portion.

Another aspect of the above embodiment provides that the method further includes: performing synchronization using a preamble sequence of the first portion of the header structure, prior to the performing demodulation on the first portion, where the preamble sequence has a length of fewer than eight symbols.

Another aspect of the above embodiment provides that the legacy demodulation scheme includes a 4-bit symbol to 32-chip mapping for performing spread demodulation, and the selected demodulation scheme includes one of the group includes: spread demodulation utilizing a 4-bit symbol to 16-chip mapping, spread demodulation utilizing a 2-bit symbol to 4-chip mapping, a differential decoding scheme, and a pilot decoding scheme.

In another embodiment of the present disclosure, a wireless communication device configured with a legacy wireless communication protocol (legacy protocol) and a multiple data rate (multi-rate) extension mechanism to the legacy protocol is provided. The wireless communication device includes: a communication stack module configured to encapsulate a data payload into a frame, where the frame includes a header structure that includes a non-legacy start-of-frame delimiter (SFD) and a modulation configuration identifier (ID), the non-legacy SFD identifies the frame as having a non-legacy frame structure specified by the multi-rate extension mechanism that is different from a legacy frame structure specified by the legacy protocol, and the modulation configuration ID identifies a selected modulation configuration. The wireless communication device also includes: a modem configured to perform modulation of the header structure according to a legacy modulation scheme specified by the legacy protocol, and perform modulation of the data payload according to a selected data payload modulation scheme specified by the selected modulation configuration, where the modem is configured to implement a plurality of modulation configurations, each of the plurality of modulation configurations specify a different data payload modulation scheme that achieves higher throughput of the data payload during transmission of the frame than a throughput achieved by utilization of the legacy modulation scheme on the data payload.

One aspect of the above embodiment provides that at least one of the plurality of modulation configurations achieves a maximum data transfer rate, at least one of the plurality of modulation configurations achieves a moderate data transfer rate, and the maximum data transfer rate and the moderate data transfer rate are faster than a legacy data transfer rate achieved by the legacy modulation scheme.

Another aspect of the above embodiment provides that the legacy modulation scheme implements a spreading factor of 8, and the selected data payload modulation scheme implements a spreading factor of less than 8.

Another aspect of the above embodiment provides that the wireless communication device further includes: a physical layer (PHY) module configured to perform offset quadrature phase shift keying (O-QPSK) modulation and O-QPSK demodulation, and perform frame transmission and frame receipt.

Another aspect of the above embodiment provides that the modem is further configured to perform demodulation of a header structure of a received non-legacy frame to produce a demodulated header structure, extract a data payload modulation configuration identifier from the demodulated header structure, and perform demodulation of a data payload of the received non-legacy frame according to a data payload modulation scheme associated with the data payload modulation configuration identifier.

It is noted that functions of various modules of node 200 and host processor 230 (such as functions performed by PHY module 204, communication stack module 212, and processing module 220) may be implemented using one or more of dedicated hardware or control logic, a shared processing device, individual processing devices, and a plurality of processing devices, where a processing device may be one or more of a microprocessor, micro-controller, digital signal processor (DSP), microcomputer, central processing unit, application specific integrated circuit (ASIC), field programmable gate array (FPGA), digital signal processing device (DSPD), programmable logic device (PLD), state machine, logic circuitry, analog circuitry, digital circuitry, and any device that manipulates signals (analog or digital) based on operational instructions.

Memory 218 may be a single memory device or a plurality of memory devices. Such a memory device may be implemented using one or more of a read-only memory, random access memory, volatile memory, non-volatile memory, static memory, dynamic memory, flash memory, and any device that stores digital information. It is noted that when functions of a module is implemented using one or more of a state machine, analog circuitry. digital circuitry, and logic circuitry, the memory storing corresponding operational instructions may be embedded with the circuitry comprising the corresponding state machine, analog circuitry, digital circuitry, and logic circuitry.

The circuitry described herein may be implemented on a semiconductor substrate, which can be any semiconductor material or combinations of materials, such as gallium arsenide, silicon germanium, silicon-on-insulator (SOI), silicon, monocrystalline silicon, the like, and combinations of the above.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

The term "coupled," as used herein, is not intended to be limited to a direct coupling or a mechanical coupling.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for frame-based communication processing performed by a first wireless communication device, the first wireless communication device configured with a legacy wireless communication protocol (legacy protocol) and a multiple data rate (multi-rate) extension mechanism to the legacy protocol, the method comprising:
    identifying a data transfer rate associated with a second wireless communication device, wherein
        the data transfer rate is identified from a group comprising a legacy data transfer rate specified by the legacy protocol and a plurality of non-legacy data transfer rates specified by the multi-rate extension mechanism,
        the legacy data transfer rate is achieved by a legacy modulation scheme specified by the legacy protocol,
        each of the plurality of non-legacy data transfer rates are achieved by a respective one of a plurality of non-legacy modulation schemes specified by the multi-rate extension mechanism, and
        each of the plurality of non-legacy data transfer rates are different than the legacy data transfer rate;
    in response to an identification of a selected non-legacy data transfer rate associated with the second wireless communication device, identifying a selected non-legacy modulation scheme associated with the selected non-legacy data transfer rate;
    performing modulation of a data payload according to the selected non-legacy modulation scheme to produce a modulated data payload;
    forming a non-legacy header structure comprising a non-legacy start-of-frame delimiter (SFD) and an identifier of the selected non-legacy modulation scheme;
    performing modulation of the non-legacy header structure according to the legacy modulation scheme to produce a modulated non-legacy header structure; and
    assembling the modulated non-legacy header structure and the modulated data payload into a non-legacy frame having a structure that is different from a legacy frame structure specified by the legacy protocol.

2. The method of claim 1, wherein
the forming the non-legacy header structure comprises
    building a non-legacy synchronization header that comprises the non-legacy SFD, and
    building a non-legacy protocol header that comprises the identifier of the selected non-legacy modulation scheme.

3. The method of claim 2, wherein
the performing modulation of the non-legacy header structure comprises
    performing spread modulation of the non-legacy synchronization header and the non-legacy protocol header according to the legacy modulation scheme.

4. The method of claim 1, further comprising:
in response to an identification of the legacy data transfer rate associated with the second wireless communication device, assembling a legacy frame according to the legacy protocol.

5. The method of claim 1, further comprising:
performing offset quadrature phase shift keying (O-QPSK) modulation on the non-legacy frame, and
transmitting the non-legacy frame to the second wireless communication device, subsequent to the performing O-QPSK modulation.

6. The method of claim 1, wherein
the legacy modulation scheme comprises a 4-bit symbol to 32-chip mapping for performing spread modulation, and
the selected modulation scheme comprises one of the group comprising:
    spread modulation utilizing a 4-bit symbol to 16-chip mapping,
    spread modulation utilizing a 2-bit symbol to 4-chip mapping,
    a differential encoding scheme, and
    a pilot encoding scheme.

7. The method of claim 1, wherein the non-legacy header structure comprises a preamble sequence having a length of fewer than eight symbols.

8. The method of claim 1, wherein the non-legacy header structure comprises a header check sequence (HCS) for at least a portion of the non-legacy header structure.

9. The method of claim 1, wherein the legacy protocol comprises IEEE 802.15.4 protocol.

10. The method of claim 1, further comprising:
in response to a determination that the second wireless communication device is also configured with the multi-rate extension mechanism, exchanging information regarding supported data transfer rates, wherein the first and second wireless communication devices support two or more different data transfer rates that are faster or slower than the legacy data transfer rate specified by the legacy protocol;
determining an appropriate data transfer rate from a group comprising the two or more different data transfer rates and the legacy data transfer rate, wherein the determining the appropriate data transfer rate is based on the information regarding supported data transfer rates and link quality information regarding a communication link between the first and second wireless communication devices;
communicating the appropriate data transfer rate to the second wireless communication device, wherein the first and second wireless communication devices are configured to utilize the appropriate data transfer rate during communication between the first and second wireless communication devices.

11. The method of claim 10, further comprising:
selecting the appropriate data transfer rate based on a determination that the second wireless communication device is within a detection range achieved by a respective one of the group comprising the two or more different data transfer rates and the legacy data transfer rate.

12. A method for frame-based communication processing performed by a wireless communication device configured with a legacy wireless communication protocol (legacy protocol) and a multiple data rate (multi-rate) extension mechanism to the legacy protocol, the method comprising:
performing demodulation on a first portion of a header structure of a received frame according to a legacy demodulation scheme specified by the legacy protocol to produce a demodulated first portion;
extracting a start-of-frame delimiter (SFD) from the demodulated first portion;
in response to a determination that the SFD is a non-legacy SFD that identifies the received frame as having a non-legacy frame structure specified by the multi-rate extension mechanism that is different from a legacy frame structure specified by the legacy protocol, performing demodulation on a second portion of the header structure of the received frame to produce a demodulated second portion;
extracting a modulation configuration identifier from the demodulated second portion; and
performing demodulation on a data payload of the received frame according to a modulation configuration identified by the modulation configuration identifier, wherein
the modulation configuration specifies a selected demodulation scheme from among a plurality of non-legacy demodulation schemes supported by the wireless communication device,
each of the plurality of non-legacy demodulation schemes is different from the legacy demodulation scheme, and
each of the plurality of non-legacy demodulation schemes achieves a data transfer rate different than a legacy data transfer rate achieved by the legacy demodulation scheme.

13. The method of claim 12, further comprising:
performing offset quadrature phase shift keying (O-QPSK) demodulation on the first portion of the header structure prior to the performing demodulation on the first portion.

14. The method of claim 12, further comprising:
performing synchronization using a preamble sequence of the first portion of the header structure, prior to the performing demodulation on the first portion, wherein the preamble sequence has a length of fewer than eight symbols.

15. The method of claim 12, wherein
the legacy demodulation scheme comprises a 4-bit symbol to 32-chip mapping for performing spread demodulation, and
the selected demodulation scheme comprises one of the group comprising:
spread demodulation utilizing a 4-bit symbol to 16-chip mapping,
spread demodulation utilizing a 2-bit symbol to 4-chip mapping,
a differential decoding scheme, and
a pilot decoding scheme.

16. A wireless communication device configured with a legacy wireless communication protocol (legacy protocol) and a multiple data rate (multi-rate) extension mechanism to the legacy protocol, comprising:
a communication stack module configured to encapsulate a data payload into a frame, wherein
the frame comprises a header structure that comprises a non-legacy start-of-frame delimiter (SFD) and a modulation configuration identifier (ID),
the non-legacy SFD identifies the frame as having a non-legacy frame structure specified by the multi-rate extension mechanism that is different from a legacy frame structure specified by the legacy protocol, and
the modulation configuration ID identifies a selected modulation configuration;
a modem configured to
perform modulation of the header structure according to a legacy modulation scheme specified by the legacy protocol, and
perform modulation of the data payload according to a selected data payload modulation scheme specified by the selected modulation configuration, wherein
the modem is configured to implement a plurality of modulation configurations,
each of the plurality of modulation configurations specify a different data payload modulation scheme that achieves higher throughput of the data payload during transmission of the frame than a throughput achieved by utilization of the legacy modulation scheme on the data payload.

17. The wireless communication device of claim 16, wherein at least one of the plurality of modulation configurations achieves a maximum data transfer rate, at least one of the plurality of modulation configurations achieves a moderate data transfer rate, and the maximum data transfer rate and the moderate data transfer rate are faster than a legacy data transfer rate achieved by the legacy modulation scheme.

18. The wireless communication device of claim 16, wherein the legacy modulation scheme implements a spreading factor of 8, and the selected data payload modulation scheme implements a spreading factor of less than 8.

19. The wireless communication device of claim 16, further comprising:
   a physical layer (PHY) module configured to
      perform offset quadrature phase shift keying (O-QPSK) modulation and O-QPSK demodulation, and
      perform frame transmission and frame receipt.

20. The wireless communication device of claim 16, wherein the modem is further configured to
   perform demodulation of a header structure of a received non-legacy frame to produce a demodulated header structure,
   extract a data payload modulation configuration identifier from the demodulated header structure, and
   perform demodulation of a data payload of the received non-legacy frame according to a data payload modulation scheme associated with the data payload modulation configuration identifier.

\* \* \* \* \*